US011633675B2

(12) United States Patent
Feltman et al.

(10) Patent No.: US 11,633,675 B2
(45) Date of Patent: Apr. 25, 2023

(54) APPARATUS AND METHOD FOR A DRILL MUD PLANT

(71) Applicants: Astec, Inc., Chattanooga, TN (US); Municipal Enterprises Ltd., Bedford (CA)

(72) Inventors: Wendell Feltman, Hixson, TN (US); Patrick Rooney, Dartmouth (CA); Jerry Scott, Halifax (CA); Kevin Risley, Chattanooga, TN (US); Bob Reed, Ooltewah, TN (US); Dusty McNabb, McDonald, TN (US)

(73) Assignees: Astec, Inc., Chattanooga, TN (US); Municipal Enterprises Ltd., Bedford (CA)

( * ) Notice: Subject to any disclaimer, the term of this patent is extended or adjusted under 35 U.S.C. 154(b) by 164 days.

(21) Appl. No.: 16/968,104

(22) PCT Filed: Feb. 6, 2019

(86) PCT No.: PCT/US2019/016825
§ 371 (c)(1),
(2) Date: Aug. 6, 2020

(87) PCT Pub. No.: WO2019/157040
PCT Pub. Date: Aug. 15, 2019

(65) Prior Publication Data
US 2021/0023473 A1 Jan. 28, 2021

Related U.S. Application Data

(60) Provisional application No. 62/626,828, filed on Feb. 6, 2018.

(51) Int. Cl.
*B01D 3/10* (2006.01)
*E21B 43/34* (2006.01)
(Continued)

(52) U.S. Cl.
CPC ............... *B01D 3/322* (2013.01); *B01D 3/02* (2013.01); *B01D 3/106* (2013.01); *B01D 17/042* (2013.01);
(Continued)

(58) Field of Classification Search
CPC .... E21B 21/063; E21B 21/065; E21B 21/066; B01D 5/0012; B01D 5/006;
(Continued)

(56) References Cited

U.S. PATENT DOCUMENTS 4,836,302 A    6/1989  Heilhecker et al.
5,030,357 A *  7/1991  Lowe ..................... B01D 17/00
                                                    210/671
(Continued)

FOREIGN PATENT DOCUMENTS

EP         0 502 882          9/1992
WO    WO 2016/044485 A1      3/2016
WO    WO 2017/137912 A1      8/2017

OTHER PUBLICATIONS

Hewitt, Geoffrey F., "REBOILERS", Thermopedia, Feb. 7, 2011, URL: https://www.thermopedia.com/content/1078/.*
(Continued)

*Primary Examiner* — Jonathan Luke Pilcher
(74) *Attorney, Agent, or Firm* — Chambliss, Bahner & Stophel, P.C.; Stephen D. Adams

(57) ABSTRACT

A remediation plant for remediating drilling mud, cuttings, and fluids. The preferred plant includes a reboiler that is adapted to provide heat to the drilling mud, cuttings, and fluid, a mud drum that is operatively connected to the reboiler, a distillation column that is operatively connected to the reboiler, a heat exchanger that is operatively connected to the reboiler, a condenser that is operatively connected to the distillation column, a condenser tank that is
(Continued)

operatively connected to the condenser, an oil-water separator that is operatively connected to the condenser tank, and a pump that is operatively connected to the oil-water separator. The preferred remediation plant is adapted to remove synthetic drilling fluid from drilling mud, cuttings, and fluids. A method for remediating drilling mud, cuttings, and fluid.

12 Claims, 20 Drawing Sheets

(51) Int. Cl.
*B01D 3/32* (2006.01)
*B01D 3/02* (2006.01)
*B01D 17/04* (2006.01)
*C09K 8/34* (2006.01)
*E21B 21/06* (2006.01)

(52) U.S. Cl.
CPC .............. *C09K 8/34* (2013.01); *E21B 21/066* (2013.01); *E21B 43/34* (2013.01)

(58) Field of Classification Search
CPC .. B01D 5/0063; B01D 3/32; B01D 3/10–108; B01J 19/305
See application file for complete search history.

(56) References Cited

U.S. PATENT DOCUMENTS

| | | | |
|---|---|---|---|
| 5,132,025 A | * | 7/1992 | Hays .................... E21B 21/063 210/615 |
| 5,262,094 A | * | 11/1993 | Chuang .................... B01D 3/22 261/114.1 |
| 2003/0136747 A1 | | 7/2003 | Wood et al. |
| 2009/0107728 A1 | | 4/2009 | Gaddis et al. |
| 2013/0331632 A1 | * | 12/2013 | Drake .................... F26B 17/20 202/185.1 |
| 2016/0236138 A1 | * | 8/2016 | Bae .................... B01D 53/1425 |

OTHER PUBLICATIONS

International Search Report and Written Opinion of counterpart PCT Application No. PCT/US2019/016825 dated Mar. 29, 2019.
European Search Report of counterpart European Application No. 19750511.8 dated Feb. 18, 2021.

* cited by examiner

CONT'D(1)

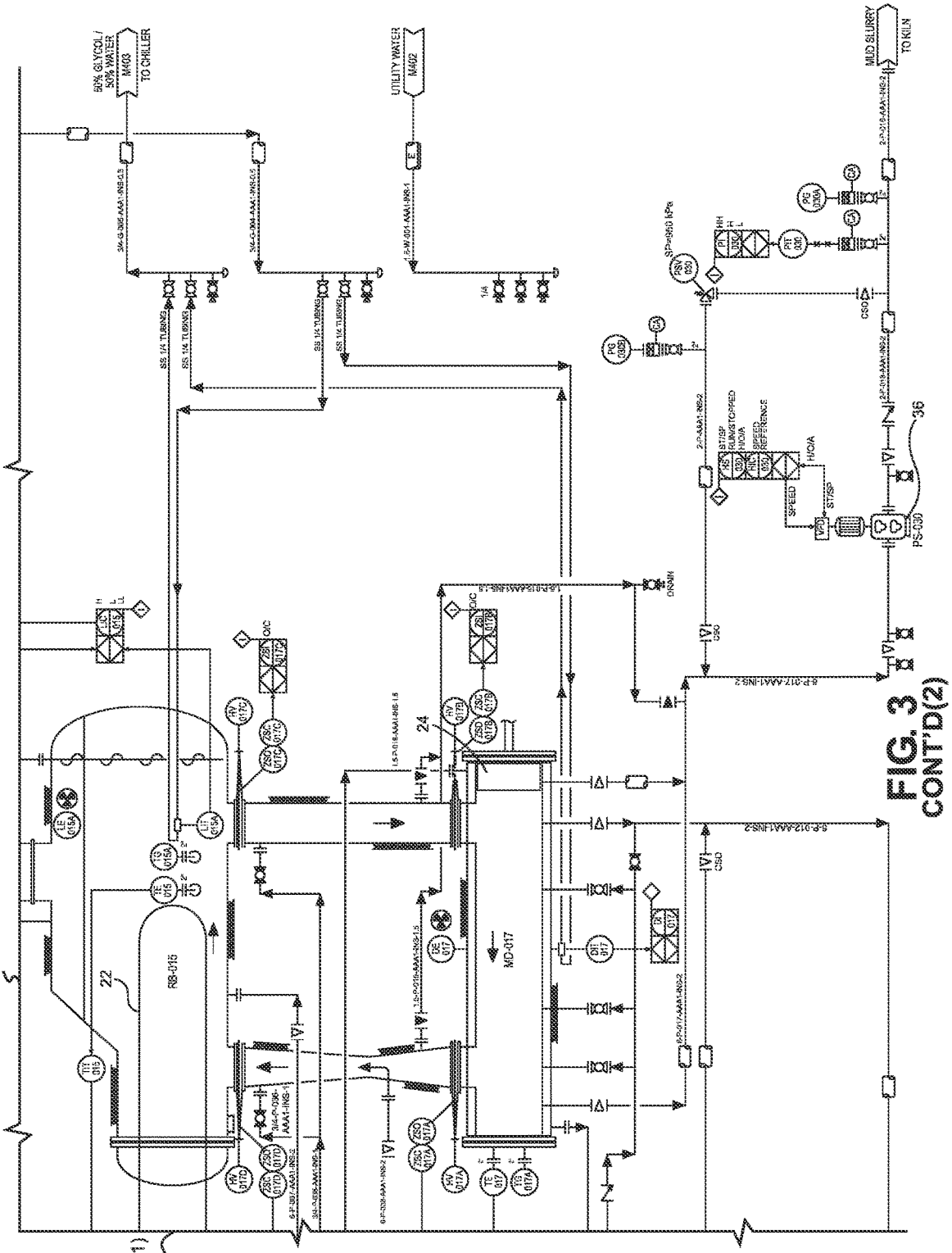
FIG. 3 CONT'D(2)

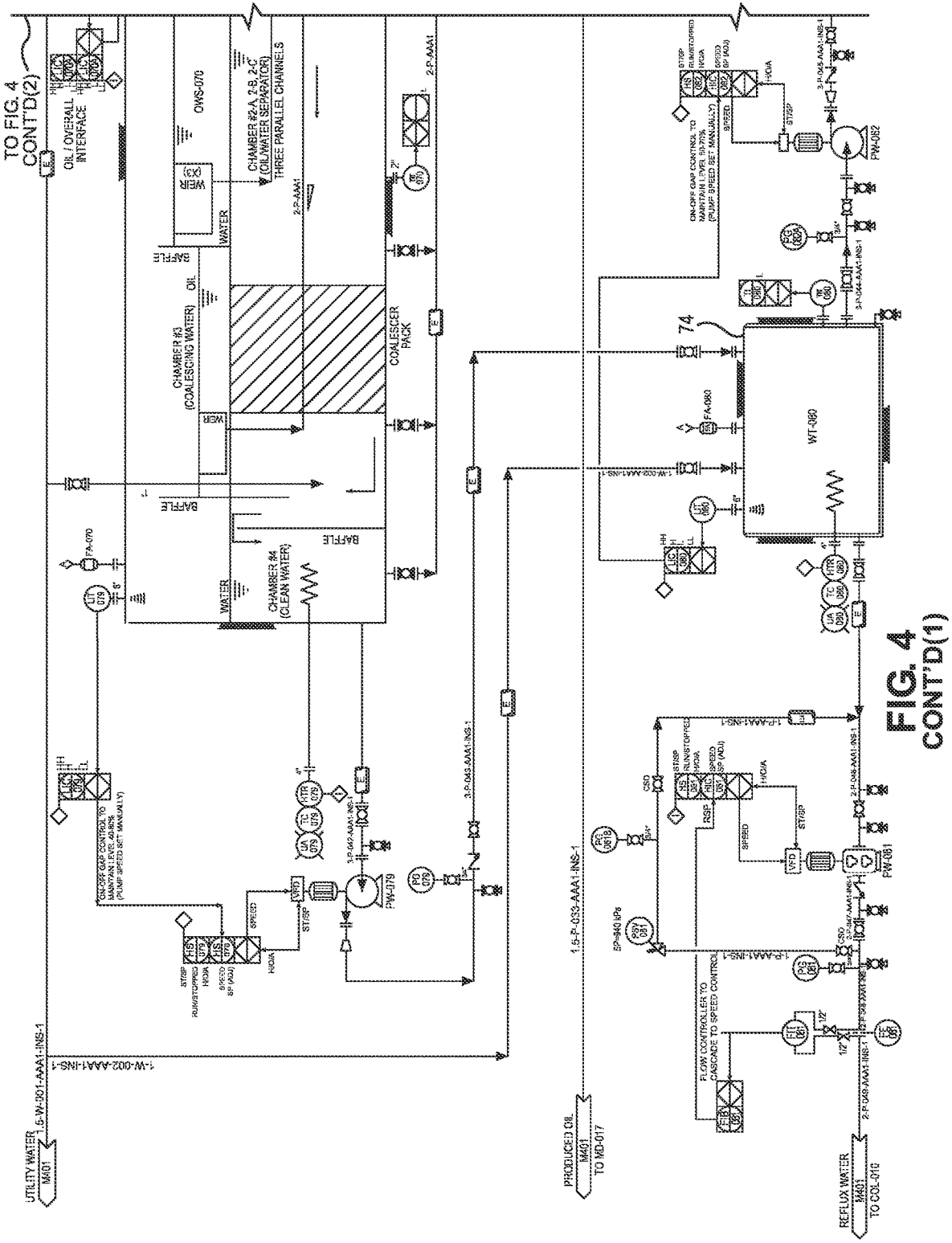

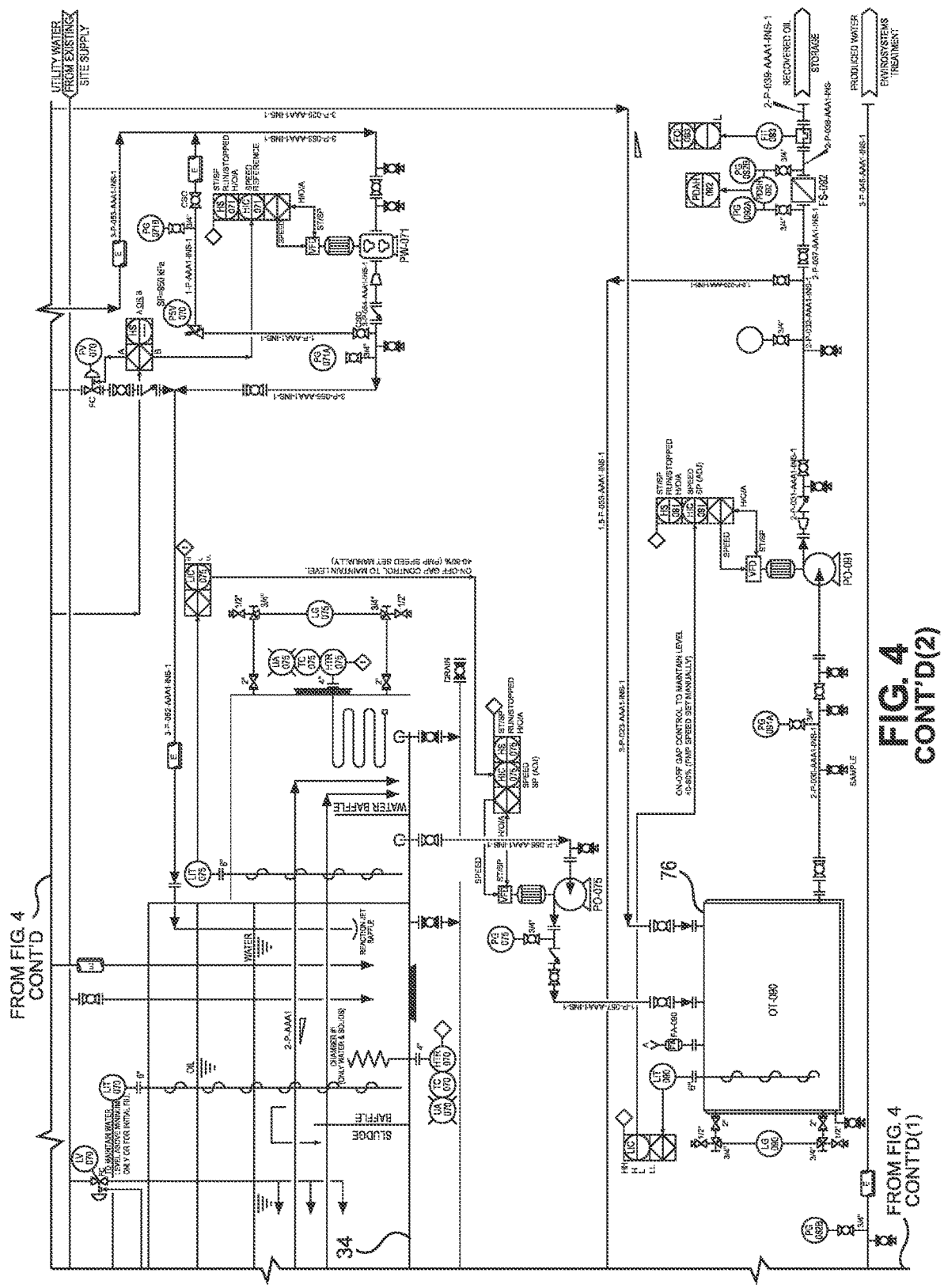

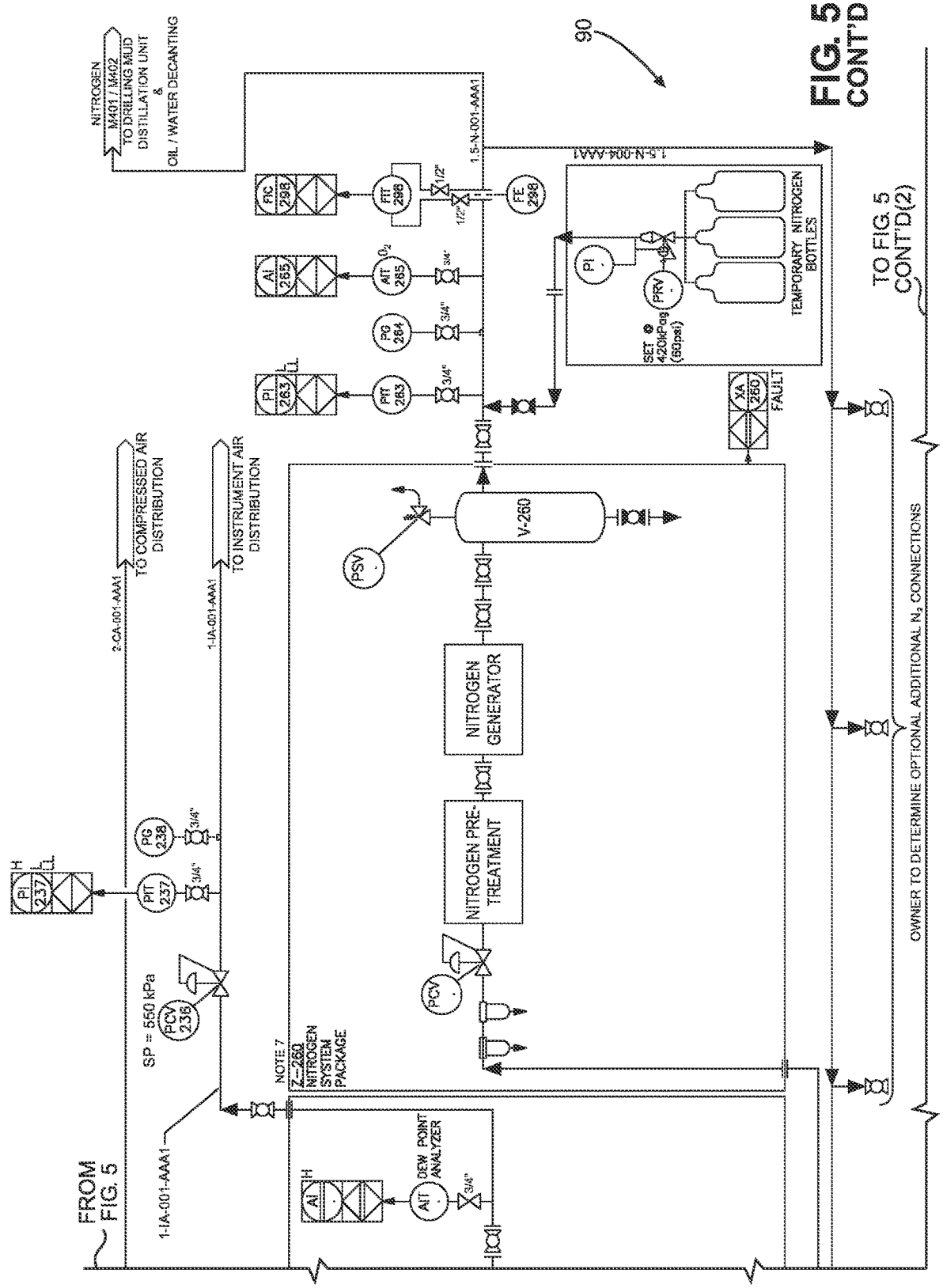

CONT'D(1)

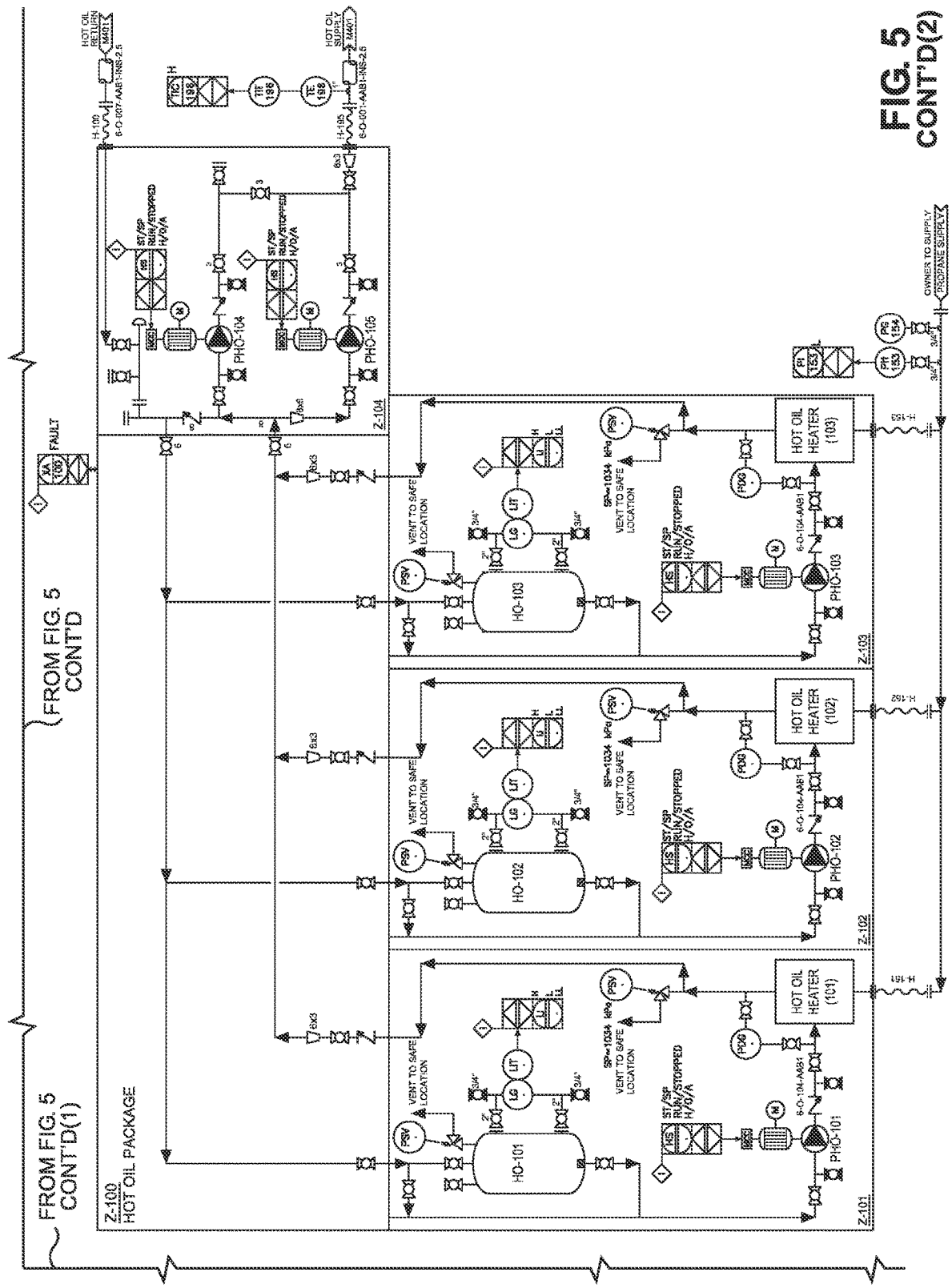

APPARATUS AND METHOD FOR A DRILL MUD PLANT

CROSS-REFERENCES TO RELATED APPLICATIONS/PATENTS

This application relates back to and claims the benefit of priority from U.S. Provisional Application for Patent Ser. No. 62/626,828 titled "Drill Mud Plant" and filed on Feb. 6, 2018.

FIELD OF THE INVENTION

The present invention relates generally to apparatuses and methods for remediation plants, and particularly to apparatuses and methods for plants for remediating drilling mud, cuttings, and fluids.

BACKGROUND AND DESCRIPTION OF THE PRIOR ART

It is known to use apparatuses and methods to remediate liquids and solids such as soil. Conventional apparatuses and methods, however, suffer from one or more disadvantages. For example, conventional apparatuses and methods do not adequately recover virgin synthetic drilling fluid such as Low Toxicity Mineral Oil (LTMO) for reuse. Conventional apparatuses and methods also do not adequately recover hydrocarbons from a mixture of hydrocarbons and aqueous liquids generated from drilling mud, cuttings or fluids recovered from oil and gas wells based on molecular weight and/or carbon chain length. Further, conventional apparatuses used to treat the waste materials resulting from difficult and deep land formations cannot typically produce the processing conditions that produce acceptable recyclable materials. Still further, some conventional methods of disposal of these waste materials are undesirably harmful to the environment. In addition, conventional apparatuses and methods are undesirably expensive to operate and maintain and are less energy efficient.

It would be desirable, therefore, if an apparatus and method could be provided that would adequately recover virgin synthetic drilling fluid such as Low Toxicity Mineral Oil (LTMO) for reuse. It would also be desirable if such an apparatus and method could be provided that would adequately recover hydrocarbons from a mixture of hydrocarbons and aqueous liquids generated from drilling mud, cuttings or fluids recovered from oil and gas wells based on molecular weight and/or carbon chain length. It would be further desirable if such an apparatus could be provided that would treat the waste materials resulting from difficult and deep land formations to produce processing conditions that produce acceptable recyclable materials. It would be still further desirable if such a method for could be provided that would not be undesirably harmful to the environment. In addition, it would be desirable if such an apparatus and method could be provided that would not be undesirably expensive to operate and maintain and would be more energy efficient.

Advantages of the Preferred Embodiments of the Invention

Accordingly, it is an advantage of the preferred embodiments of the invention claimed herein to provide an apparatus and method that adequately recovers virgin synthetic drilling fluid such as Low Toxicity Mineral Oil (LTMO) for reuse. It is also an advantage of the preferred embodiments of the invention claimed herein to provide an apparatus and method that adequately recovers hydrocarbons from a mixture of hydrocarbons and aqueous liquids generated from drilling mud, cuttings or fluids recovered from oil and gas wells based on molecular weight and/or carbon chain length. It is another advantage of the preferred embodiments of the invention claimed herein to provide an apparatus that treats the waste materials resulting from difficult and deep land formations so as to produce processing conditions that produce acceptable recyclable materials. It is still another advantage of the preferred embodiments of the invention claimed herein to provide a method that is not undesirably harmful to the environment. It is yet another advantage of the preferred embodiments of the invention claimed herein to provide an apparatus and method that is not undesirably expensive to operate and maintain and is more energy efficient.

Additional advantages of the preferred embodiments of the invention will become apparent from an examination of the drawings and the ensuing description.

Explanation of the Technical Terms

The use of the terms "a," "an," "the," and similar terms in the context of describing the invention are to be construed to cover both the singular and the plural, unless otherwise indicated herein or clearly contradicted by context. The terms "comprising" "having," "including," and "containing" are to be construed as open-ended terms (i.e., meaning "including, but not limited to,") unless otherwise noted. The terms "substantially," "generally," and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "attached," "connected," and "interconnected," refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as," "preferred," and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

SUMMARY OF THE INVENTION

The apparatus of the invention comprises a remediation plant for remediating drilling mud, cuttings, and fluids. The preferred remediation plant comprises a reboiler that is adapted to provide heat to the drilling mud, cuttings, and fluid, a mud drum that is operatively connected to the reboiler, a distillation column that is operatively connected to the reboiler, a heat exchanger that is operatively connected to the reboiler, a condenser that is operatively connected to the distillation column, a condenser tank that is operatively connected to the condenser, an oil-water separator that is operatively connected to the condenser tank, and a pump that is operatively connected to the oil-water separator. The preferred remediation plant is adapted to remove synthetic drilling fluid from drilling mud, cuttings, and fluids.

The method of the invention comprises a method for removing synthetic drilling fluid from drilling mud, cuttings, and fluid. The preferred method comprises providing a remediation plant. The preferred remediation plant comprises a reboiler that is adapted to provide heat to the drilling mud, cuttings, and fluid, a mud drum that is operatively connected to the reboiler, a distillation column that is operatively connected to the reboiler, a heat exchanger that is operatively connected to the reboiler, a condenser that is operatively connected to the distillation column, a condenser tank that is operatively connected to the condenser, an oil-water separator that is operatively connected to the condenser tank, and a pump that is operatively connected to the oil-water separator. The preferred remediation plant is adapted to remove synthetic drilling fluid from drilling mud, cuttings, and fluids. The preferred method further comprises removing synthetic drilling fluid from drilling mud, cuttings, and fluids.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
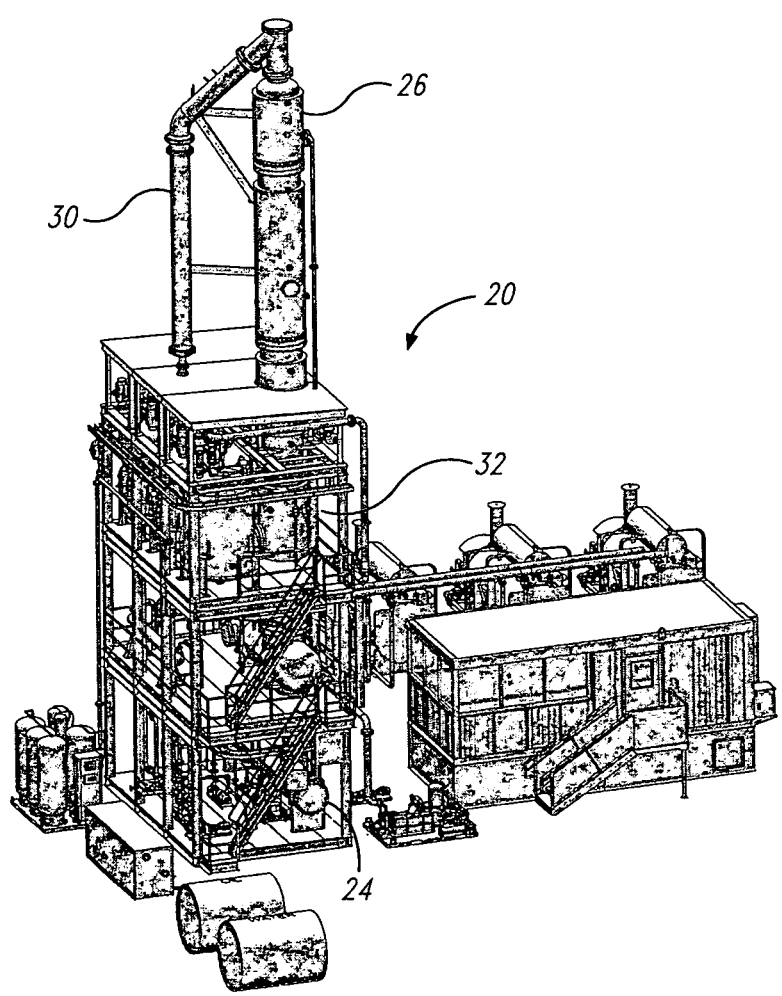
FIG. 1 is a front perspective view of the preferred embodiment of the remediation plant in accordance with the present invention.

Referring now to the drawings, the preferred embodiment of the material control device in accordance with the present invention is illustrated by FIGS. 1 through 13.

Referring now to FIG. 1, a perspective view of the preferred embodiment of the remediation plant in accordance with the present invention is illustrated. As shown in FIG. 1, the preferred remediation plant is designated generally by reference numeral 20. Preferred remediation plant 20 comprises mud drum 24, distillation column 26, condenser 30, and condenser tank 32. More particularly, preferred remediation plant 20 comprises mud drum 24 that is operatively connected to the reboiler (see FIG. 2), distillation column 26 that is operatively connected to the reboiler, condenser 30 that is operatively connected to the distillation column, and condenser tank 32 that is operatively connected to the condenser. The preferred remediation plant is adapted to remove synthetic drilling fluid from drilling mud, cuttings, and fluids.

Figure 2:
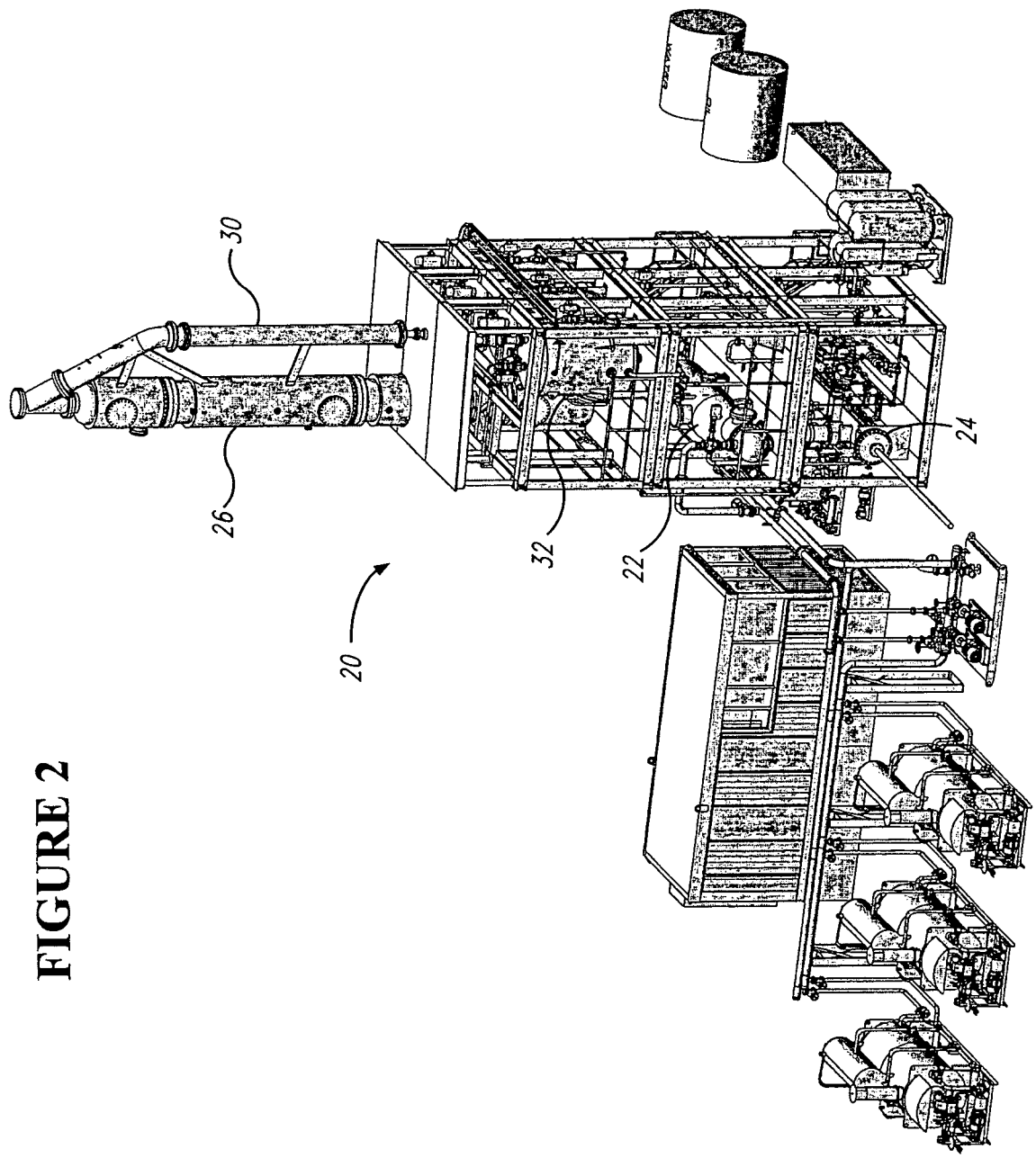
FIG. 2 is a back perspective view of the preferred embodiment of the remediation plant illustrated in FIG. 1.

Referring now to FIG. 2, a perspective view of preferred remediation plant 20 is illustrated. As shown in FIG. 2, the preferred remediation plant is designated generally by reference numeral 20. Preferred remediation plant 20 comprises reboiler 22, mud drum 24, distillation column 26, condenser 30, and condenser tank 32. Preferred reboiler 22 reboiler 22 is adapted to provide heat to the drilling mud, cuttings, and fluid.

Figure 3:
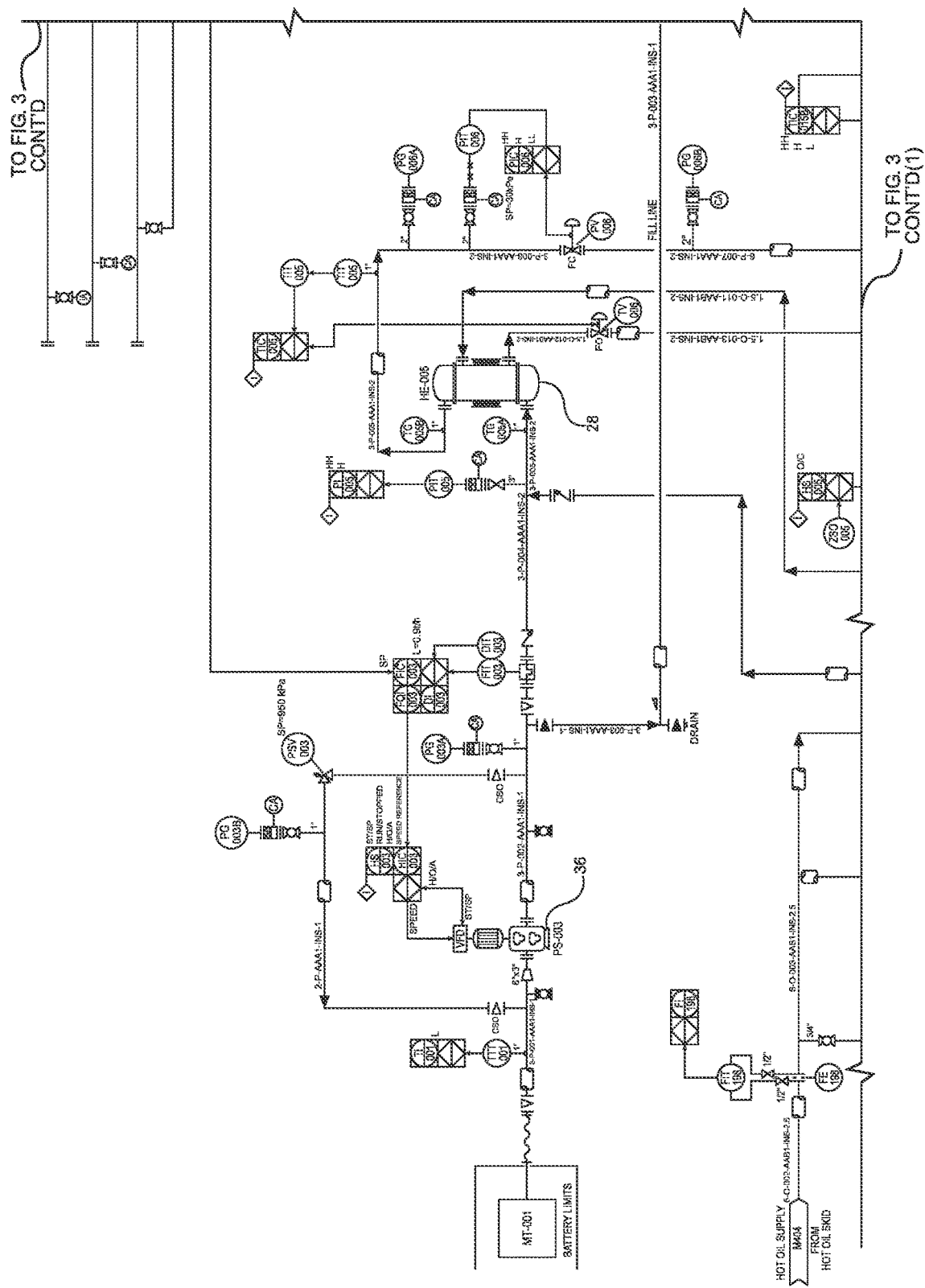
FIG. 3 is a plan view of the preferred embodiment of the distillation unit of the remediation plant illustrated in FIGS. 1-2.
Figure 3:
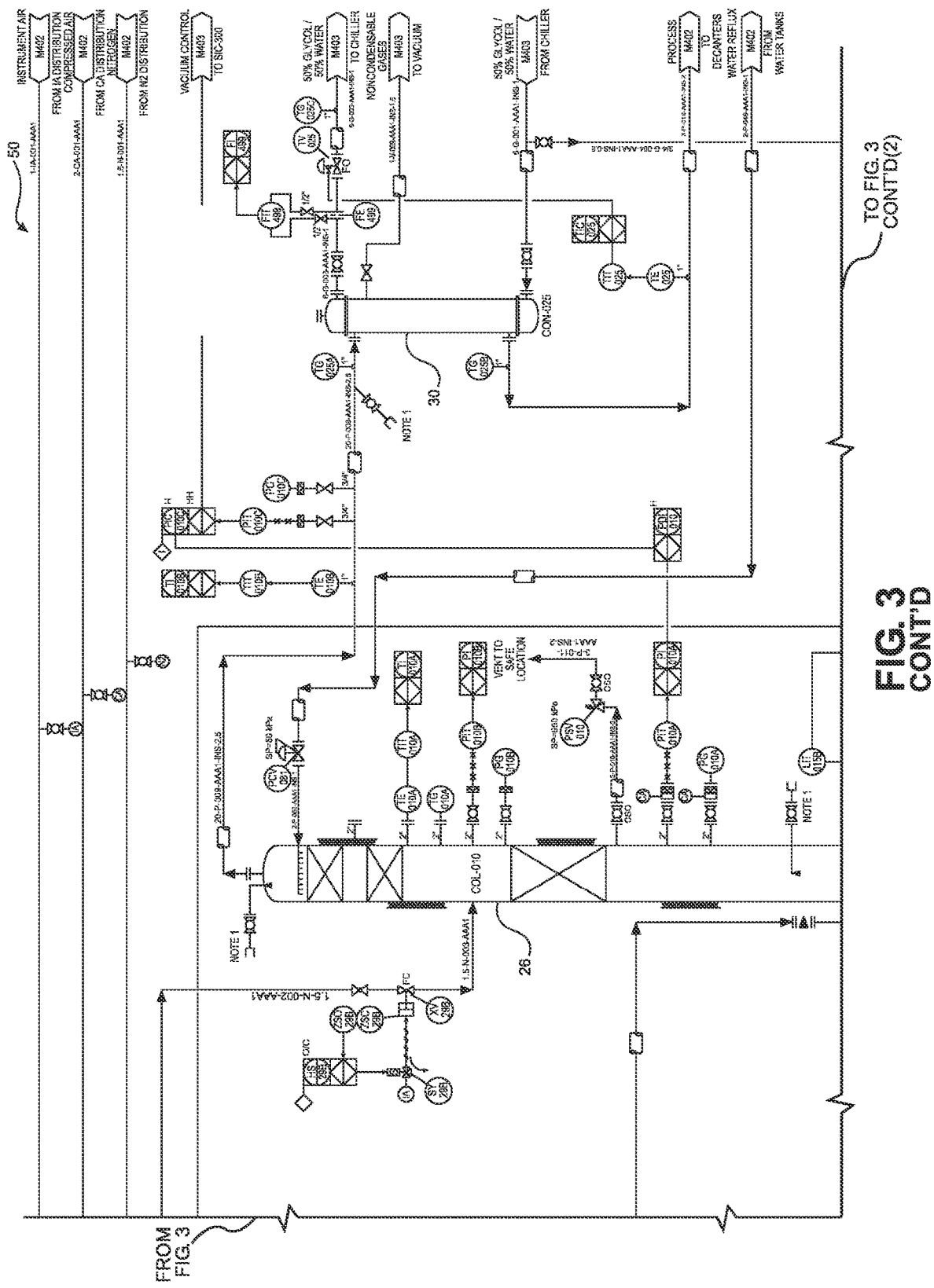
Figure 3:
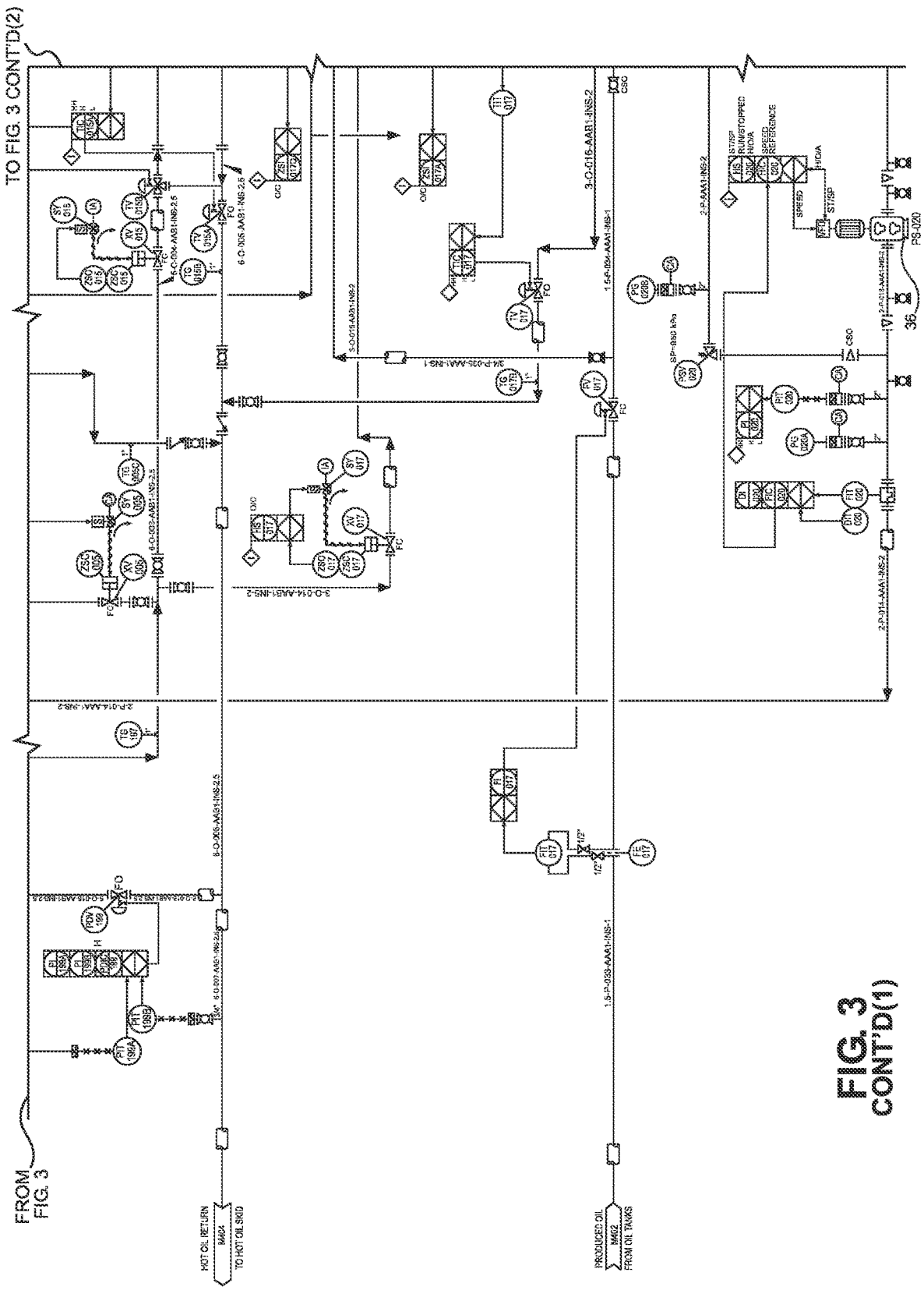

Referring now to FIG. 3, a plan view of the preferred embodiment of the distillation unit of remediation plant 20 is illustrated.

Referring now to FIG. 3, a plan view of the preferred embodiment of the distillation unit of remediation plant 20 is illustrated. As shown in FIG. 3, preferred distillation unit is designated generally by reference numeral 50. Preferred distillation unit 50 comprises reboiler 22, mud drum 24, distillation column 26, heat exchanger 28, condenser 30, and pump 36 that is operatively connected to the oil-water separator.

Still referring to FIG. 3, preferred heat exchanger 28 heat exchanger 28 is operatively connected to the reboiler, and is a vertically oriented shell & tube heat exchanger designed to maximize heat transfer between the hot oil system and drilling mud stream to provide sufficient temperatures before it enters the vacuum distillation unit (VDU). Hot oil is utilized on the shell side, counter currently, while drilling mud flows through the tube side. The hot oil flow is modulated by a control valve receiving feedback from a heat exchanger outlet temperature instrument on the drilling mud piping leading to the VDU/reboiler.

Still referring to FIG. 3, preferred overhead condenser 30 is a vertically oriented shell & tube heat exchanger designed to maximize heat transfer between the glycol chiller system to completely condense overhead vapors from the distillation column. Although it is designed for complete condensation of overhead vapors, considerations for non-condensable gases (NCGs) have been incorporated into the design to ensure there are not operational limitations due to gas buildup of air or nitrogen in the vessel. A small manually operated valve can be used to purge NCGs from the condenser as needed.

Still referring to FIG. 3, overhead vapor enters condenser 30 on the shell side, flowing down through the vessel while condensing. Liquid is collected from the bottom and drains to condenser tanks 32. The cold glycol/water mixture from the chiller enters on the tube side, flowing counter currently.

Its flow is controlled by a control valve receiving feedback from a temperature instrument on the outlet of condenser 30 (on the condensed liquid line draining to condenser tanks 32). Preferred condenser 30 allows for overcooling beyond the temperature point of condensation to ensure full conversion of vapor to liquid.

Still referring to FIG. 3, preferred pumps 36 are positive displacement pumps (rotary lobe type) to accommodate the physical characteristics of the streams to be pumped.

Still referring to FIG. 3, the preferred VDU system comprises the following: a hot oil heating system; a vacuum distillation column; a vacuum pump; a vapor condensing unit; a carbon scrubber system; and various transfer and feed pumps. The preferred VDU system also comprises a reactor vessel consisting of a fractional distillation column. Different configurations of the column are possible and may include the addition/removal of a bottom reboiler, internal packing, internal spray arms, internal bubble plates/caps, etc. The column typically has at least one feed inlet line, a recirculation line, a water reflux line, a hydrocarbon reflux line, a raw feed injection line, and a nitrogen supply line. The column preferably has at least one vapor line located at the upper end of the column through which vapors can leave and enter the vapor collection and condensing system. The column also preferably has at least one sludge discharge outlet whereby sludge from the distillation column is sent to the sludge dewatering system via a line for further processing.

Still referring to FIG. 3, the preferred heat source for the VDU system is supplied by a hot oil heating system which generates hot oil that is circulated through a heat exchanger via a plurality of lines. The hot oil is heated internally through a heater coil and can be heated electrically, by combustion of fossil fuels or by any other suitable means. Within the heat exchanger, heat is preferably transferred to the recirculating waste drilling mud/cutting as they are circulated through the heat exchanger via a recirculation line. A slipstream of untreated waste drilling mud/cuttings can be added to the recirculation line via an injection line . . . . The location of the injection line can vary along the recirculation line depending on the configuration of the system. The temperature of the material within the recirculating line and the column is maintained to ensure that the appropriate water and/or hydrocarbon fraction is being volatilized from the waste drilling mud cuttings.

Still referring to FIG. 3, the preferred vapor outlet connects the distillation column to the vapor collection and condensing system. The preferred vapor collection and condensing system comprises a heat exchanger, one or more condensers, and one or more activated carbon scrubbers. The preferred heat exchanger has one inlet for hot vapor and one or more outlets leading to a liquid decanting receiver system. The preferred exchanger also has one inlet and one outlet for the recirculating coolant from the condenser unit. The vapor collection system may also include a catalytic reactor vessel. The catalytic reactor vessel may contain a variety of catalysts or chemicals that can remove impurities or degradation products contained within the hot vapor.

Still referring to FIG. 3, within the preferred vapor collection and condensing system heat is transferred from the hot vapors to the recirculating coolant. Preferably, as the hot vapors enter the heat exchanger via a line, the coolant being recirculated by the chiller pump through the exchanger via the line removes heat from the hot vapor. When the vapor passing through the exchanger and loses its heat to the coolant, the vapor condenses back into liquid form within the exchanger. The liquid phase leaves the exchanger via a line and enters the decanting receivers. The remaining non-condensables within the vapor stream (comprised of leakage and/or entrained air) leaves the exchanger via a line, passes through the decanting receivers, and enters the activated carbon scrubber. The activated carbon scrubber will remove any trace light end hydrocarbons from the exhaust stream. Exhaust from the activated carbon scrubber is preferably discharged to the atmosphere via a line and stack.

Figure 4:
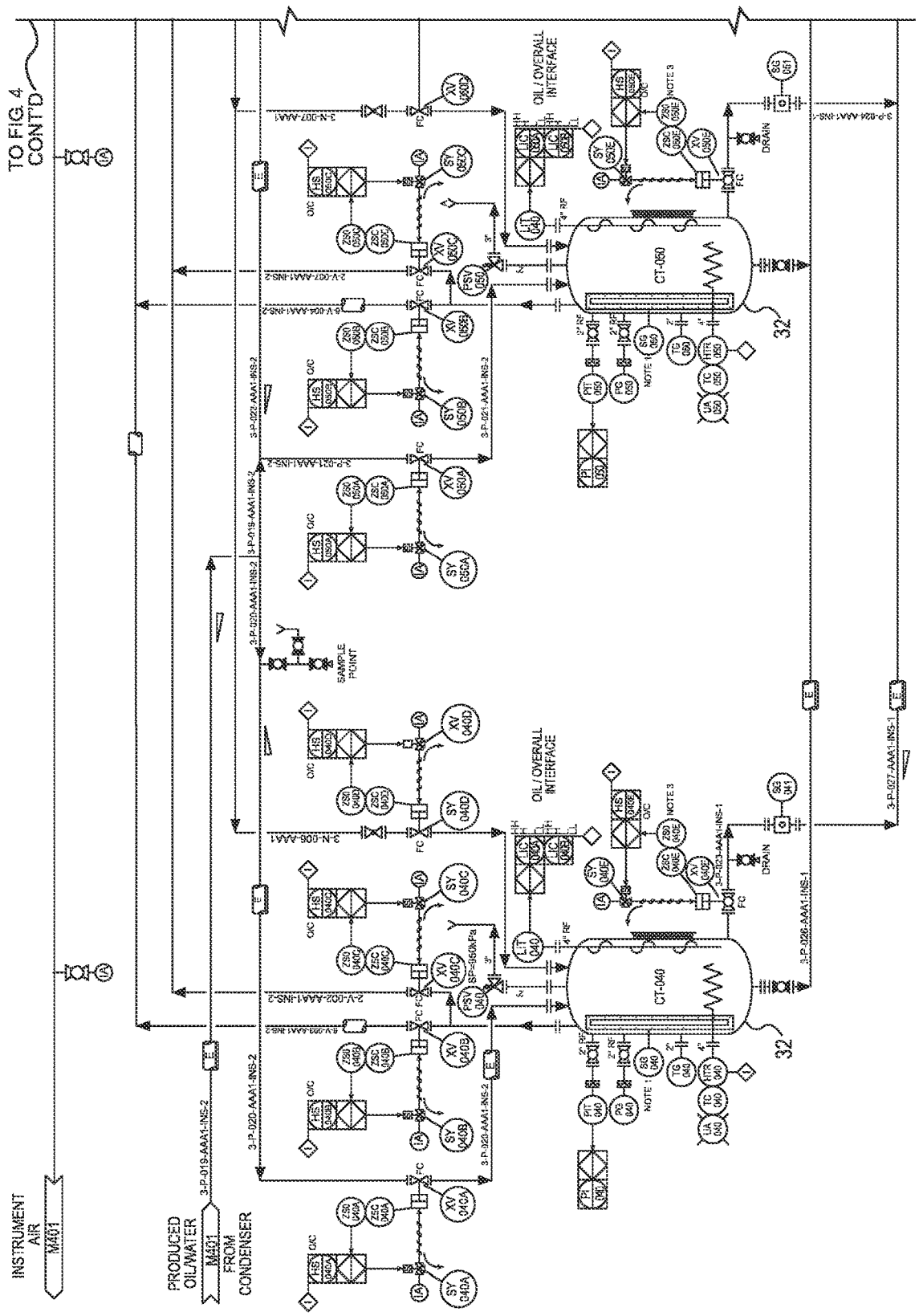
FIG. 4 is a plan view of the preferred water decanting unit of the remediation plant illustrated in FIG. 1-3.
Figure 4:
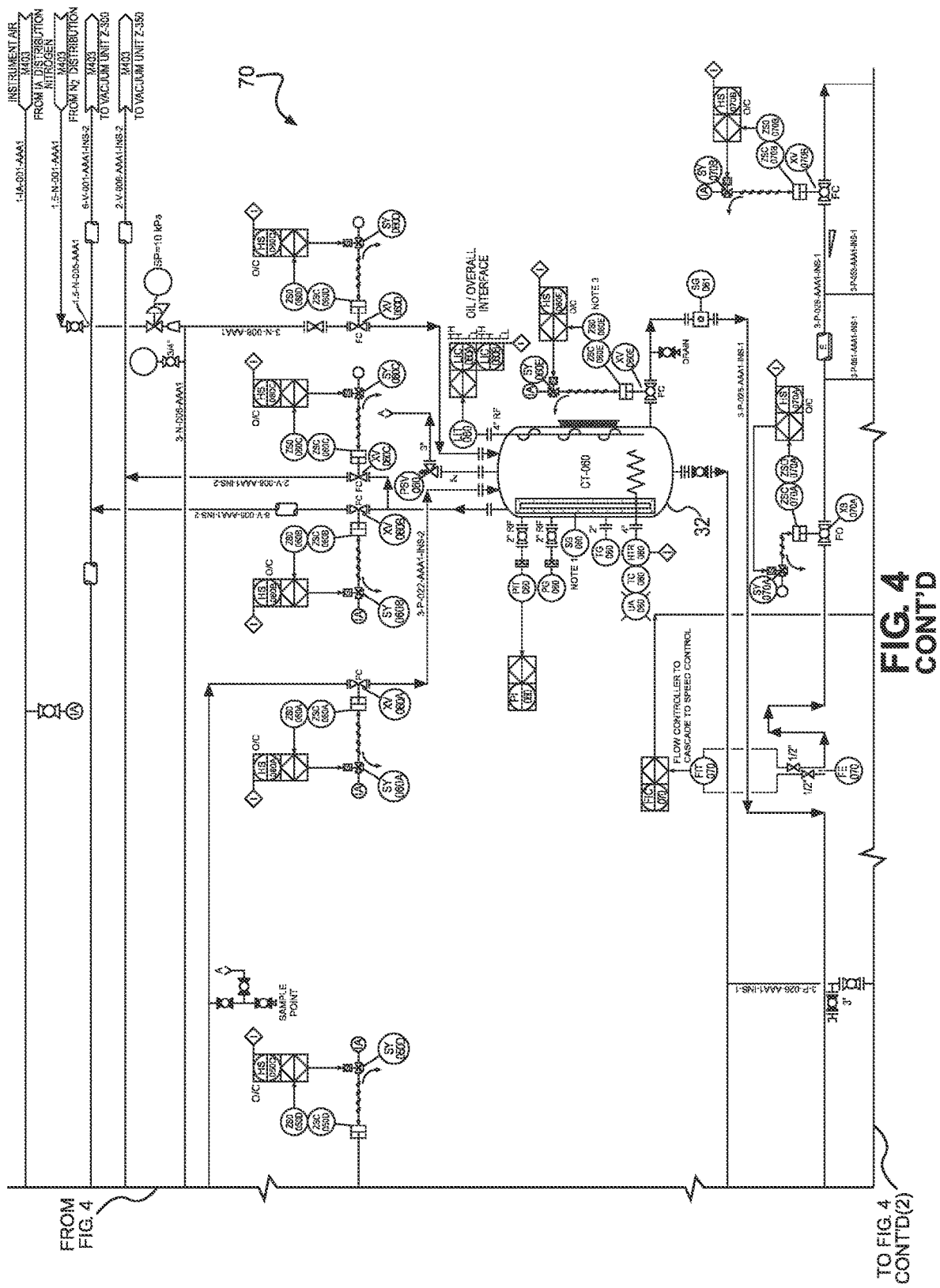

Referring now to FIG. 3 and FIG. 4, a plan view of the preferred water decanting unit of remediation plant 20 is illustrated. As shown in FIG. 4, the preferred water decanting unit is designated generally by reference numeral 70. Preferred water decanting unit 70 comprises condenser tanks 32, oil-water separator 34, recovered LTMO hydrocarbon storage vessel 74, recovered clean water storage vessel 76, one or more recovered slops storage vessels, and various transfer and feed pumps.

Still referring to FIG. 3 and FIG. 4, the preferred decanting receiver system collects all liquids generated in the heat exchanger via a line. The preferred decanter receiving system comprises one or more decanting receivers, an oil-water separator that is operatively connected to the condenser tank, one or more recovered hydrocarbon storage vessels, and one or more recovered water storage vessels. Preferably, as liquids leave the heat exchanger via a line they enter the main decanting receivers. The preferred decanting receivers store the condensed material until it is pumped to the oil-water separator via a line. The oil-water separator may be constructed in various configurations and may contain aids such as coalescing packs, inclined plates, or other items that aid in the efficient separation of hydrocarbons and water. The decanting receivers and oil/water separator may also contain an injection port that allows for the addition of chemicals that aid in the separation process.

Still referring to FIG. 3 and FIG. 4, the preferred oil-water separator has two or more exit points leading to the hydrocarbon storage vessel, the water storage vessel, and/or slop storage vessel fed via a line. The LTMO hydrocarbon phase generated within the oil-water separator is preferably gravity fed to the hydrocarbon storage vessel via a line and subsequently transferred to bulk storage via a line. The clean water phase generated within the decanting receiver is gravity fed to the water storage vessel via a line and subsequently transferred to bulk storage via a line. The slop phase, generated via overlap at the start and end of the LTMO recovery phase, comprises a mixture of oil/water/emulsified rag and is sent to a decanting receiver and is then pumped to the oil-water separator. Once the drilling fluid fraction of hydrocarbons contained within the drilling mud/cuttings have been volatilized, the remaining solids/sludge in the distillation column are preferably removed via a line and sent to storage, transported, and/or further treated in the system as required.

Figure 5:
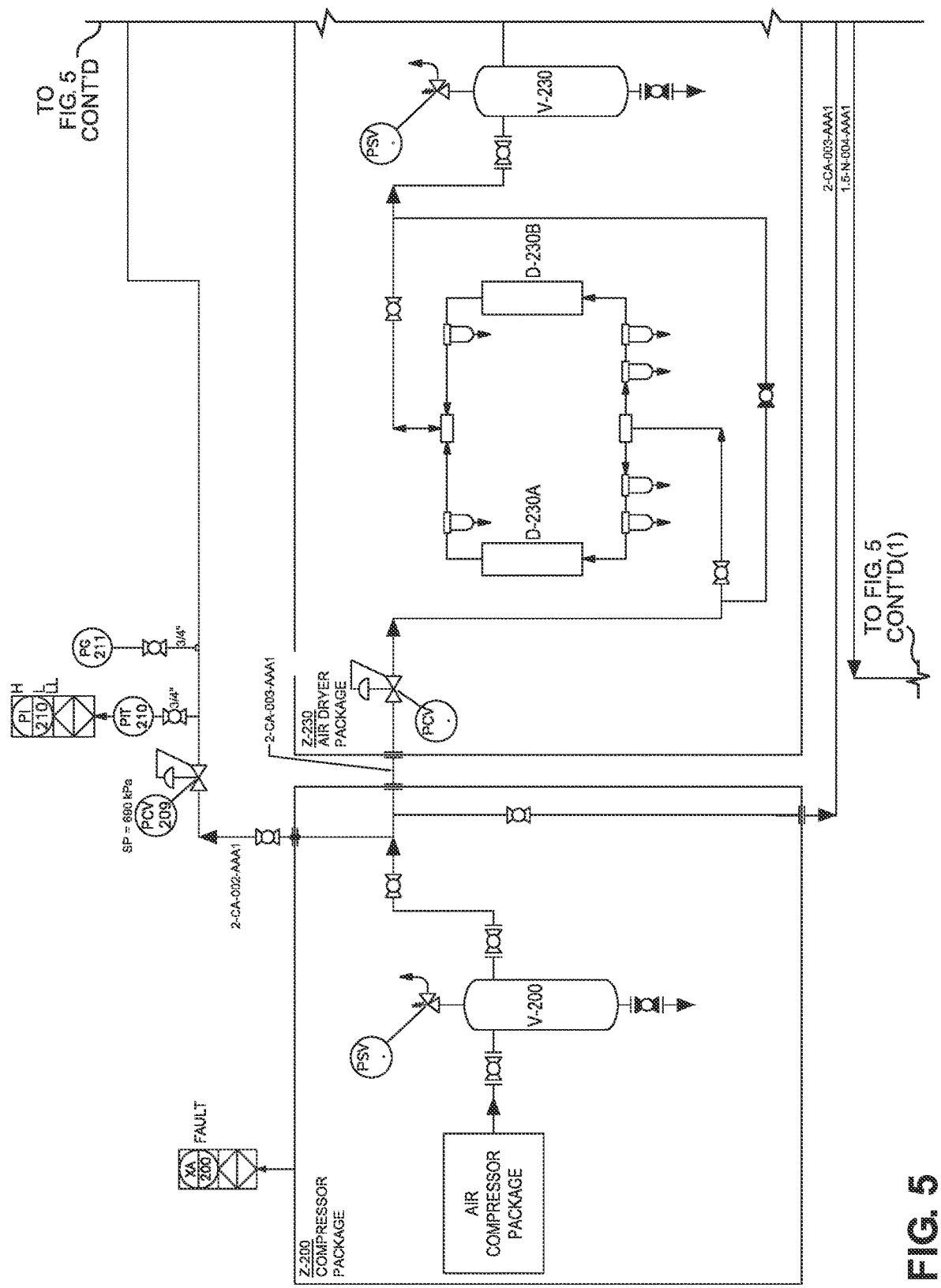
FIG. 5 is a plan view of the preferred utility systems of the remediation plant illustrated in FIGS. 1-4.
Figure 5:
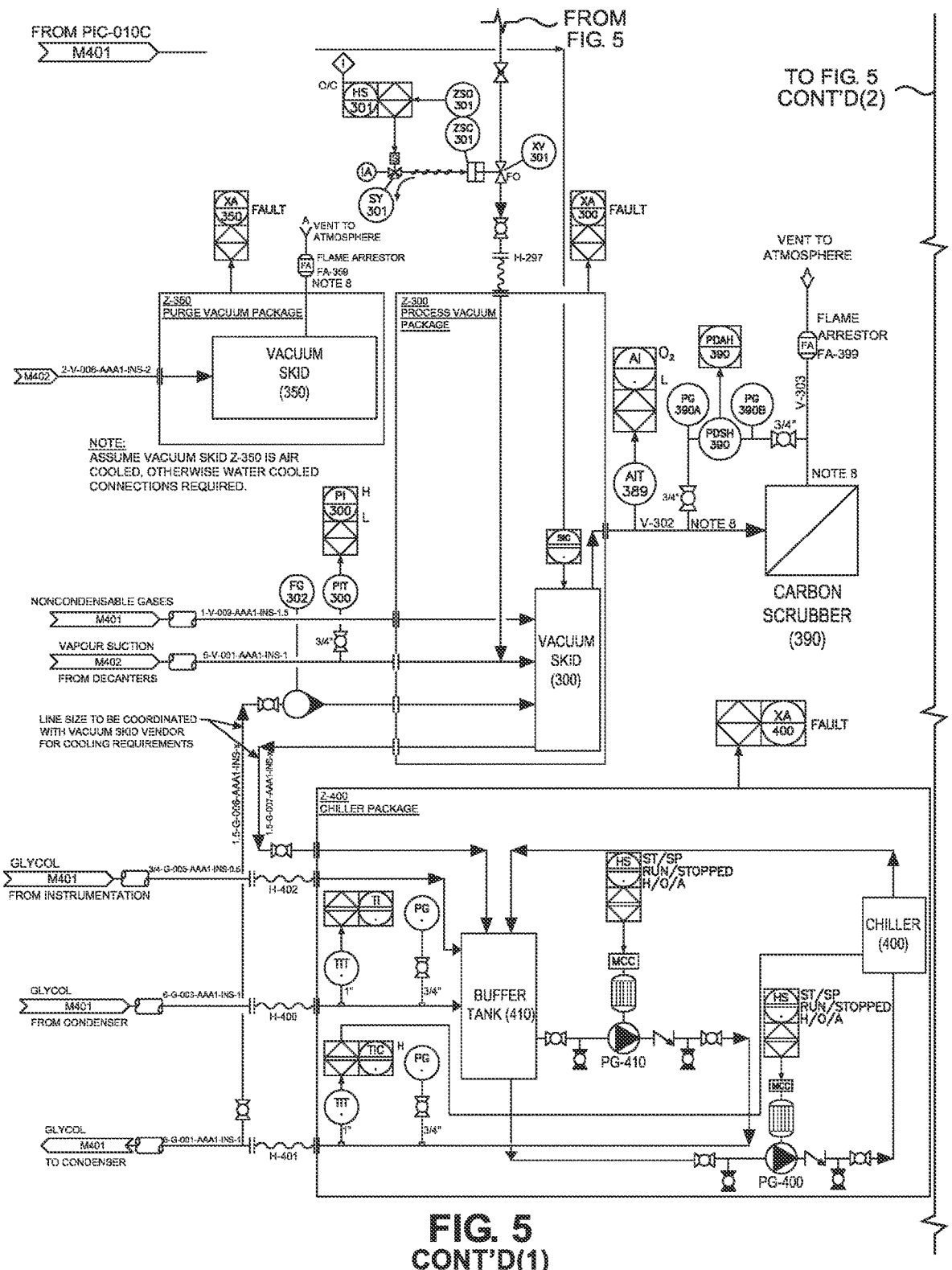

Referring now to FIG. 3 and FIG. 5, a plan view of the preferred utility systems of remediation plant 20 is illustrated. As shown in FIG. 5, the preferred utility systems are designated generally by reference numeral 90. Preferred utility systems 90 comprise a hot oil package system that is a fuel fired heater that supplies and reheats oil/thermal fluid for the main distillation process, a chiller package system that is an ammonia-based refrigerant system utilized to cool water-glycol from condenser 30 loop and adapted to provide cooling to the nuclear instrument on the reboiler-mud drum. In addition, vacuum skids use vacuum pumps to provide continuous vacuum on distillation column 26, and to bring condenser tanks 32 back online to vacuum conditions following decanting. Compressed and dried air are required for the operation of control valves and other instruments as well as for supply to the nitrogen generation system. Nitrogen is both generated and stored in the system for two purposes. First, in the event of an emergency, it will be automatically added to the distillation process to inert oxygen, if the vacuum system exhaust exceeds concentrations at risk of flammability or explosion. Second, for the process, nitrogen will be used to pressurize condenser tanks 32 during decanting to prevent introducing oxygen into the tanks when they are removed from vacuum operation/drained into oil-water separator 34. The carbon scrubber is a pollution mitigation installation to remove VOCs from vacuum exhaust.

Figure 6:
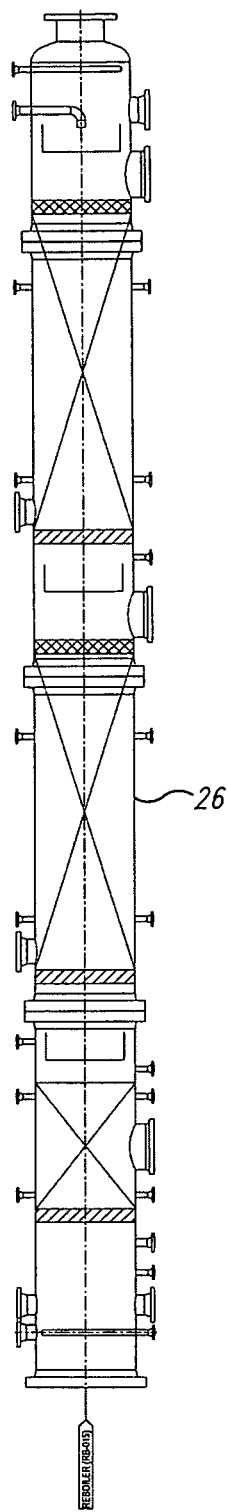
FIG. 6 is a front view of the preferred distillation column of the remediation plant illustrated in FIGS. 1-5.

Referring now to FIG. 6, a front view of preferred distillation column 26 of remediation plant 20 is illustrated. As shown in FIG. 6, preferred distillation column 26 is designed to meet the overhead quality of the LTMO/water being vaporized while keeping heavy carbon compounds (>C24) in the bottoms. This is achieved through appropriate diameter selection to prevent hydraulic limitations such as entrained liquid or vapor, while also selecting an appropriate height and internal equipment design for achieving high overhead quality parameters (>99% purity). The internals equipment are comprised of a mix of injection pipes, distributor plates, support grids, and structured and random packing incorporated into the design to improve the separation of vapor and bottoms components. Packing also provides a capture mechanism in the bottom section of the column to prevent foam or solids carryover into the overhead vapor.

Still referring to FIG. 6, instrumentation for measuring and controlling pressure has been incorporated into the column design to reduce variation in operating pressures, reducing the demand on heat supply, as boiling temperatures are pressure-dependent. The primary instrument for measuring and controlling pressure is located on the overhead vapor piping, however there are backup instruments on the column for operational verification. The pressure may be controlled by the vacuum skid systems using feedback from the pressure instrumentation to increase or decrease vacuum pump demand. Nitrogen may be added to the column between packed sections to provide emergency oxygen inertion to reduce the risk of flammability or explosion.

Figure 7:
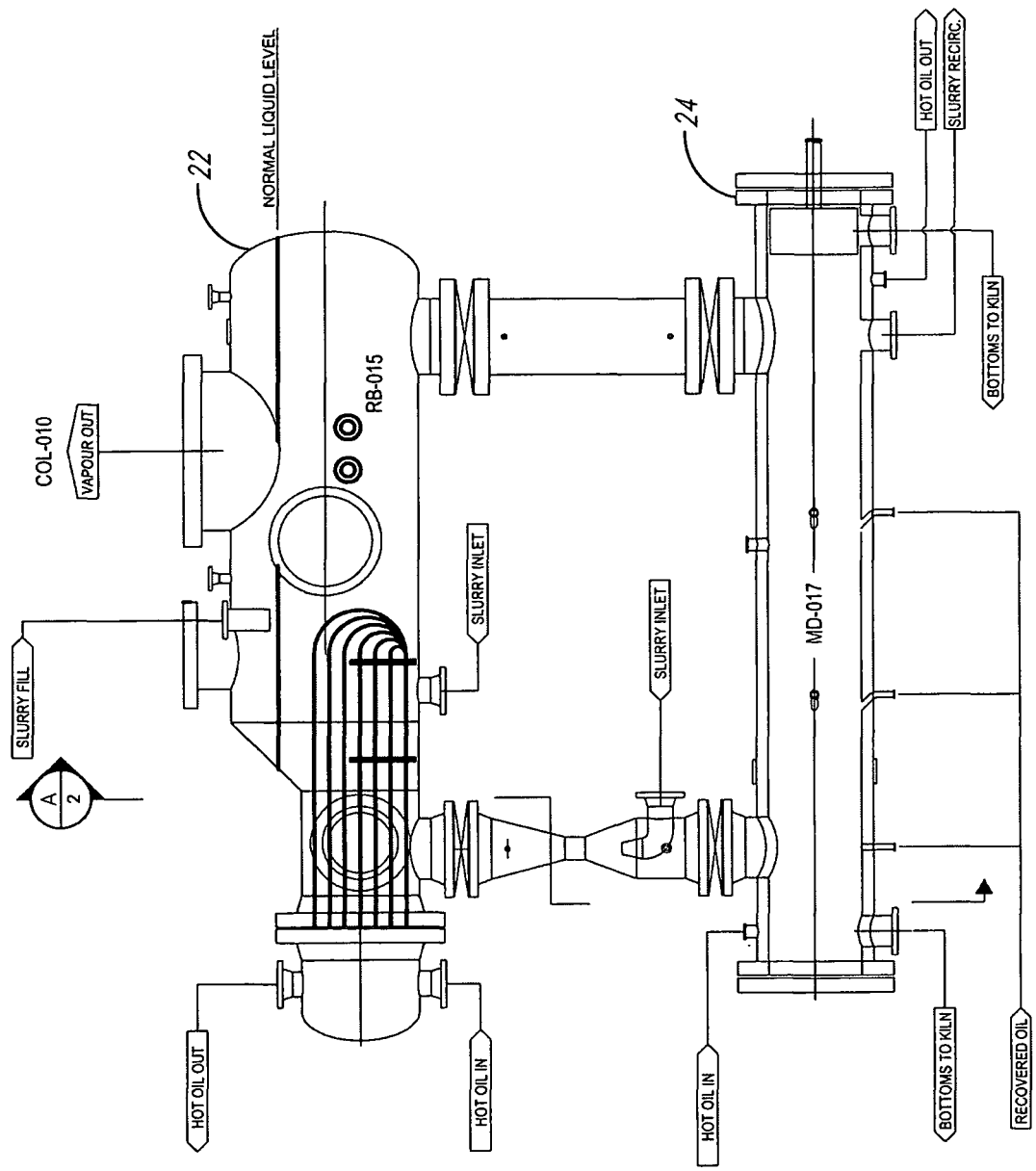
FIG. 7 is a front view of the preferred reboiler and mud drum of the remediation plant illustrated in FIGS. 1-6.

Referring now to FIG. 7, a front view of preferred reboiler 22 and mud drum 24 of remediation plant 20 is illustrated. As shown in FIG. 7, reboiler 22 is preferably a kettle type reboiler that is equipped with heat supply tubes & baffles for both heat and solids distribution. It is connected to a heat jacketed mud drum mounted below for control of solids density and consistent heat distribution. It is connected above to distillation column 26 for ease of vapor formation and flow for distillation. There is a Venturi (narrowed piping) connection between reboiler 22 and mud drum 24, as well as a number of baffles to promote a natural flow between the vessels and to promote settling of solids in the mud drum where they are to be removed.

Still referring to FIG. 7, high density solids have been projected to be an operational limitation in the reboiler/mud drum. There are three design details to overcome this. There is a connection to the mud drum and reboiler for supplying purified LTMO as necessary to aid in diluting the mixture when solids density increases. High density solids may also be pumped or purged from the bottom of the mud drum. Finally, the solids may be physically removed, or pushed out of the vessel, by a hydraulic piston or ram located in the mud drum. Valves isolating the mud drum from the reboiler allow the solids to be removed without interrupting the distillation process.

Still referring to FIG. 7, advanced instrumentation or sensors have been selected for monitoring solids density and the operating levels in the reboiler/mud drum assembly as well. Due to the potential high temperatures (300° C.), high solids density, and vacuum conditions it is difficult to find robust and reliable instrumentation. Nuclear and guided wave technologies were utilized for this purpose to provide a primary and backup method of monitoring the operating parameters of this equipment during continuous operation. Temperature sensors may be installed in both the reboiler and mud drum vessels to control the flow of hot oil required to meet the selected set point.

Figure 8:
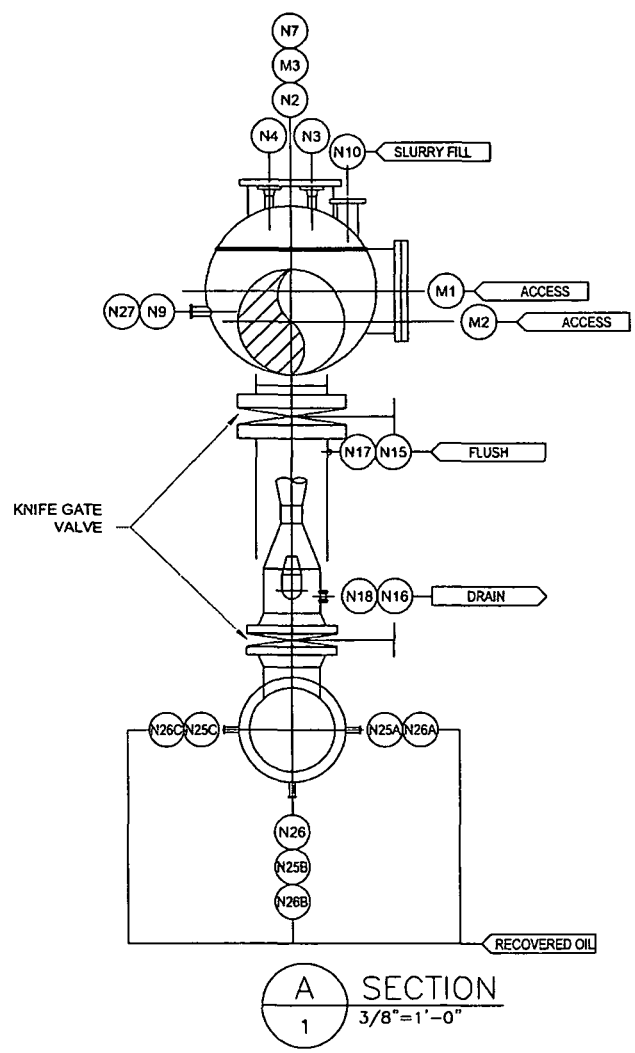
FIG. 8 is a sectional view of the preferred reboiler and mud drum of the remediation plant illustrated in FIGS. 1-7.

Referring now to FIG. 8, a sectional view of preferred reboiler 22 and mud drum 24 of remediation plant 20 is illustrated.

Figure 9:
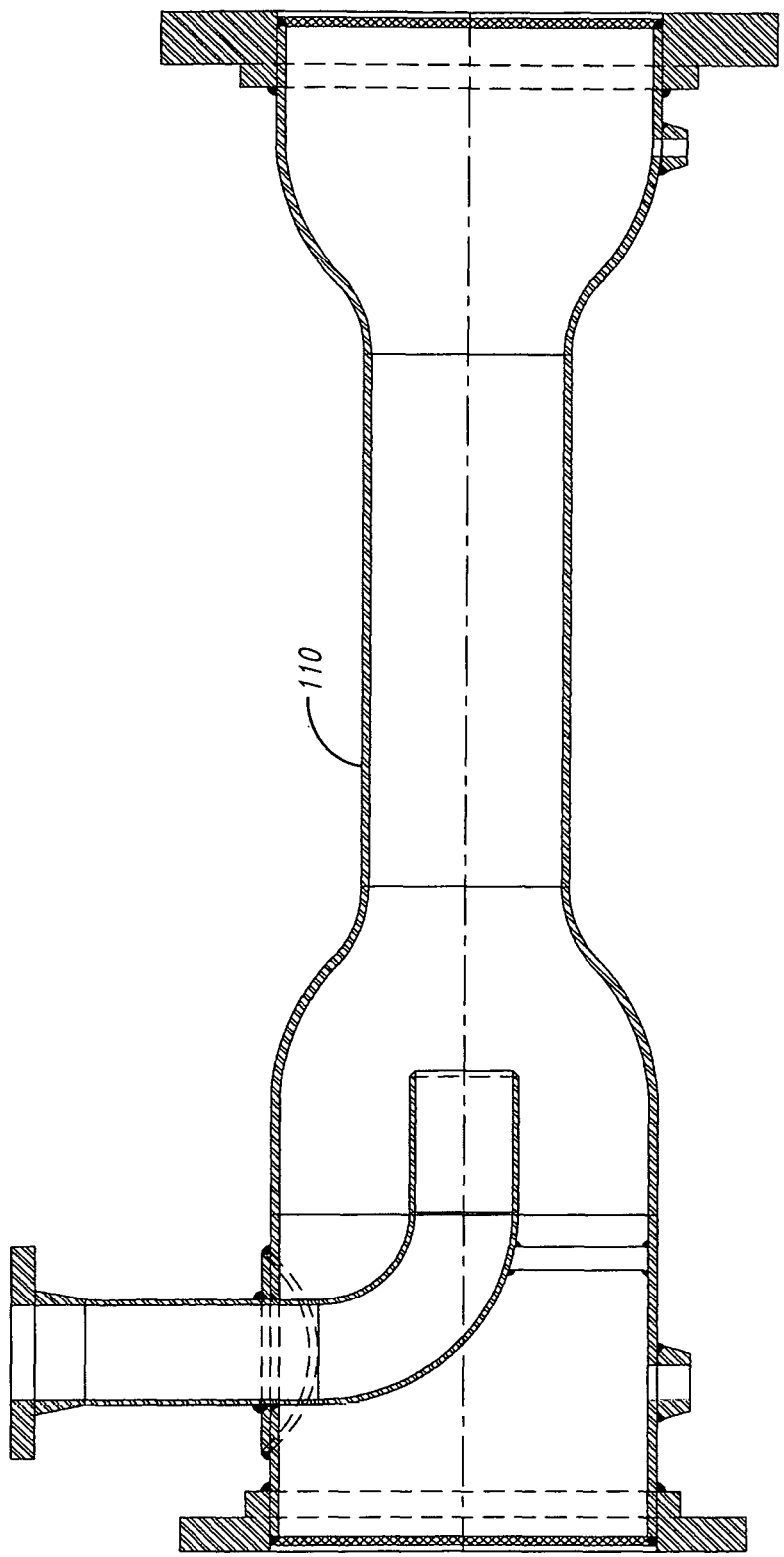
FIG. 9 is a sectional view of the preferred Venturi riser of the remediation plant illustrated in FIGS. 1-8.

Referring now to FIG. 9, a sectional view of the preferred Venturi riser of remediation plant 20 is illustrated. As shown in FIG. 9, the preferred Venturi riser is designated generally by reference numeral 110.

Figure 10:
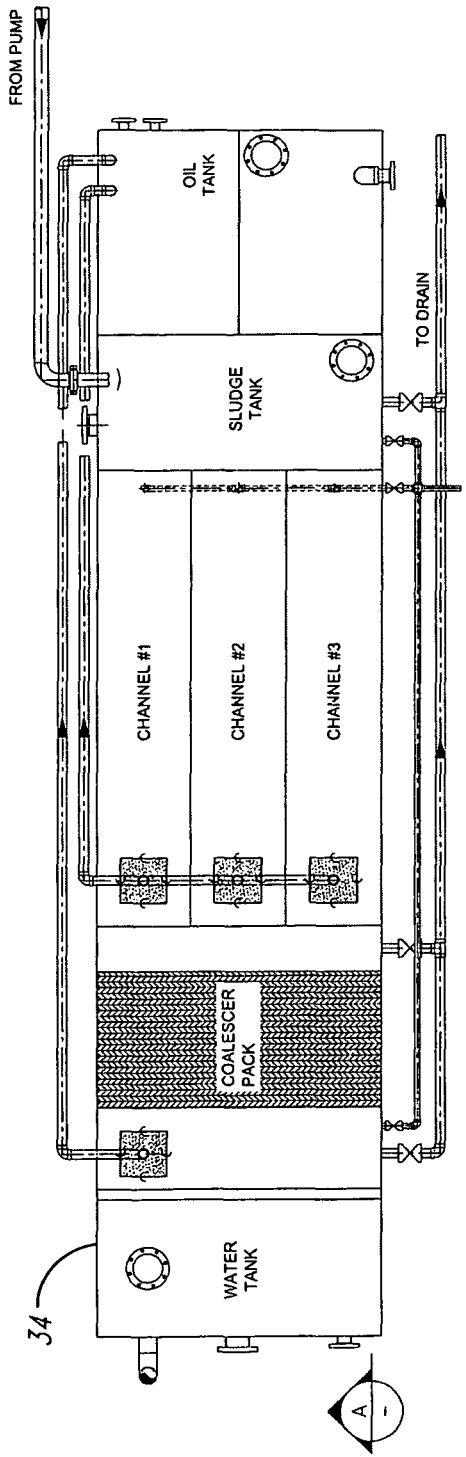
FIG. 10 is a plan view of the preferred oil-water separator of the remediation plant illustrated in FIGS. 1-9.

Referring now to FIG. 10, a plan view of preferred oil-water separator 34 of remediation plant 20 is illustrated. As shown in FIG. 10, oil-water separator 34 is adapted to provide additional purification of both the LTMO/oil phase and water phase. Preferred separator 34 uses a combination of typical oil-water separation design methods including the dimensional criteria used by the American Petroleum Institute as well as the application of Stoke's Law for gravity settling/flotation/skimming. Preferably, oil-water separator 34 receives fluids drained from condenser tanks 32 in the first chamber which is equipped with a baffle to capture any possible solids carryover. As the fluid passes through chamber 2, oils are floated through natural gravity separation and then overflow into the weir boxes which drain to Chamber 5. Chamber 3 has a coalescer pack installed to promote the gravity-mechanical separation of finer oil droplets from water (also collected and sent to Chamber 5 via weir box). Chamber 4 contains a baffle to allow overflow of the clean water from the previous chambers. The purified oil in Chamber 5 is then ready for transfer to LTMO storage. Preferred oil-water separator 34 is equipped with electric heaters for freeze protection.

Still referring to FIG. 10, preferred oil-water separator 34 requires a stable fill level to provide adequate separation. This is achieved by providing makeup water when necessary, provided through an open-closed valve that is automated with the level indicator output. The vessel is also required to operate below a maximum design flow rate (or decant rate) from condenser tanks 32. The flow rate is controlled either by a variable frequency drive (flow varied) pump or by a control valve, automated with a flow instrument on the decant piping, depending on whether it is being pumped or flowing by gravity.

Figure 11:
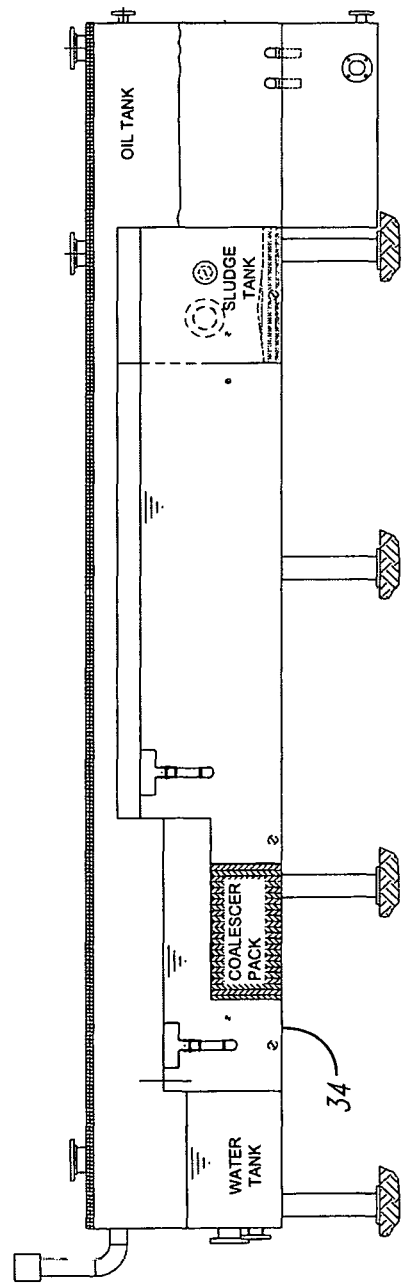
FIG. 11 is a sectional view of the preferred oil-water separator of the remediation plant illustrated in FIGS. 1-10.

Referring now to FIG. 11, a sectional view of preferred oil-water separator 34 of remediation plant 20 is illustrated.

Figure 12:
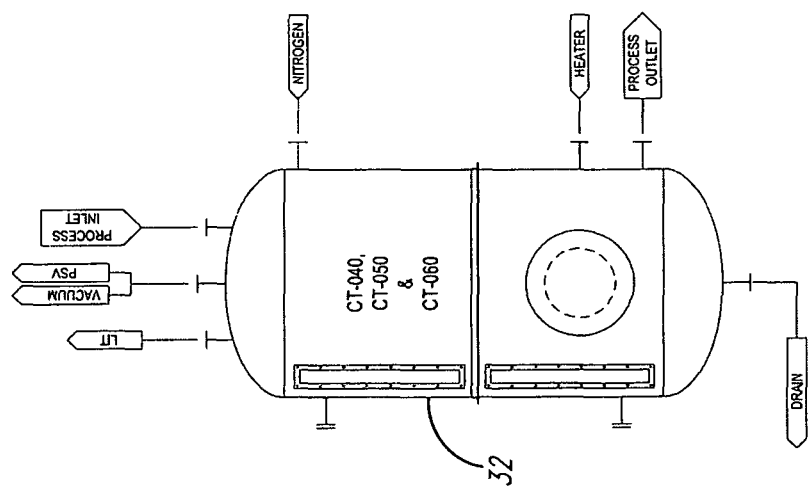
FIG. 12 is a front view of the preferred condenser tank of the remediation plant illustrated in FIGS. 1-11.

Referring now to FIG. 12, a front view of preferred condenser tank 32 of remediation plant 20 is illustrated. As shown in FIG. 12, condenser tank 32 is preferably sized to allow for an approximate one hour cycle time between vacuum fills, pressurized/atmospheric decants, and return to vacuum fill operation. They are designed with separate connections for vacuum and nitrogen, to be utilized for pressure control of the vessel. Nitrogen was selected as a method of applying pressure during decanting due to the flammability and explosion risk of exposing the tanks to atmosphere during higher operating temperatures. Tanks are equipped with sight glasses or view ports to allow operators to see oil and water interface during decanting. They also have an option use guided-wave level sensors for measuring the levels of both the top of water and top of oil phase. Preferred condenser tanks 32 are equipped with electric heaters for freeze protection.

Figure 13:
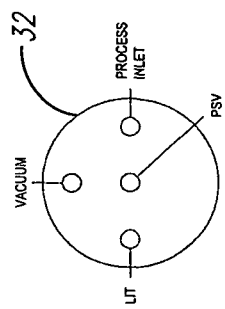
FIG. 13 is a plan view of the preferred condenser tank of the remediation plant illustrated in FIGS. 1-12.

Referring now to FIG. 13, a plan view of preferred condenser tank 32 of remediation plant 20 is illustrated.

The invention also comprises a method for remediating drilling mud, cuttings, and fluid. The preferred method comprising providing a remediation plant. The preferred remediation plant further comprises removing synthetic drilling fluid from drilling mud, cuttings, and fluid. Preferably, to begin production, the pressure inside the VDU's distillation column, reboiler, mud drum, and condenser is reduced to 30-100 mmHg using a continuous vacuum pump skid. Heat is supplied from the hot oil/thermal fluid heating system (vacuum skid/hot oil shown on FIG. 5). The drilling mud feed, which may or may not be mixed with the recycle stream, is then fed to a heat exchanger to be pre-heated by the hot oil before continuing to the reboiler to begin vacuum distillation. Process feed parameters are as follows:

| Drilling Mud & Cuttings | Approx. % by weight |
| --- | --- |
| Water (with impurities) | 30-60% |
| Total Oil/Hydrocarbons | 10-30% |
| Solids | 10-40% |

The feed is heated gently in the reboiler to promote the vaporization of water, then the temperature is increased to vaporize the LTMO at the boiling temperature required to remove the C10-24 hydrocarbon compounds from the heavier compounds. After flowing through the packed distillation column, the overhead vapor is condensed via cooling by the water-glycol supply from the chiller.

Following the condenser, the water/oil stream is collected in one of three condenser tanks during distillation. Once filled, they are decanted under pressure after being taken offline form the continuous distillation process. The condenser tanks are utilized one at a time in this process to allow them to be removed from vacuum conditions individually without interrupting the distillation process. Following a short settling time period to allow gravity separation of water and oil, the decanted oil from the condenser tanks can be sent directly to an oil tank, or it can be sent to the oil-water separator for further purification. The oil-water separator is the only stage of the process that is operated under atmospheric conditions. The separated water from the condenser tanks is processed through the oil-water separator for purification before discharge and then it is sent to a water tank. Some of the collected process water may be used as reflux, or stripping, in the distillation column (added in a nozzle near the top of the column at a low flow rate). This is a standard process is distillation to aid in maintaining high purity of the overhead vapor product, dropping heavier components back to the bottom.

The hot oil system is a fuel fired heater that supplies and reheats oil/thermal fluid for the main distillation process. The chiller is an ammonia based refrigerant system utilized to cool water-glycol from the condenser loop and also to provide cooling to the nuclear instrument on the reboiler-mud drum. The vacuum skids use vacuum pumps to provide continuous vacuum on the distillation column, and to bring the condenser tanks back online to vacuum conditions following decanting. Compressed and dried air is used for the operation of control valves and other instruments as well as for supply to the nitrogen generation system. Nitrogen is both generated and stored and used in two methods; namely (i) for emergency, it will be automatically added to the distillation process to inert oxygen, if the vacuum system exhaust exceeds concentrations at risk of flammability or explosion, and (ii) for the process, it will be used to pressurize the condenser tanks during decanting to prevent introduction oxygen into the tanks when they are removed from vacuum operation/drained into the oil-water separator. The carbon scrubber is a pollution mitigation installation to remove VOCs from vacuum exhaust.

After flowing through the packed distillation column, the overhead vapor is condensed via cooling by the water-glycol supply from the chiller (FIG. 5). As shown on FIG. 4, following the condenser, the water/oil stream is collected in one of three condenser tanks during distillation. Once filled, they are decanted under pressure after being taken offline from the continuous distillation process. The condenser tanks are utilized one at a time in this process to allow them to be removed from vacuum conditions individually without interrupting the distillation process. Following a short settling time period to allow gravity separation of water and oil, the decanted oil from the condenser tanks can be sent directly to an oil tank, or it can be sent to the oil-water separator for further purification. The oil-water separator is the only stage of the process that is operated under atmospheric conditions. The separated water from the condenser tanks is processed through the purification before discharge and then it is sent to a water tank. Some of the collected process water may be used as water reflux, for stripping of vapors in the distillation column (added in a nozzle near the top of the column at a low flow rate). This is a standard process is distillation to aid in maintaining high purity of the overhead vapor product, dropping heavier components back to the bottom.

In operation, several advantages of the preferred embodiments of the apparatus and method for a remediation plant are achieved. For example, the preferred embodiments of the apparatus and method for a remediation plant adequately recover virgin synthetic drilling fluid such as Low Toxicity Mineral Oil (LTMO) for reuse. The preferred embodiments of the apparatus and method for a remediation plant also adequately recover hydrocarbons from a mixture of hydrocarbons and aqueous liquids generated from drilling mud, cuttings or fluids recovered from oil and gas wells based on molecular weight and/or carbon chain length. Further, the preferred embodiments of the apparatus and method for a remediation plant treat the waste materials resulting from difficult and deep land formations so as to produce processing conditions that produce acceptable recyclable materials. Still further, the preferred embodiments of the apparatus and method for a remediation plant provide a method that is not undesirably harmful to the environment. In addition, the preferred embodiments of the apparatus and method for a remediation plant are not undesirably expensive to operate and maintain and are more energy efficient.

In addition, the preferred embodiments of the invention overcome the known challenges of treating waste drilling mud and cuttings to recover valuable drilling fluids by using a high vacuum continuous distillation process, or VDU, with the following additional features. The distillation column and the reboiler are utilized together to produce overhead vapor and bottoms concentrated materials. The VDU will allow the drilling fluid or LTMO to be effectively removed as vapor while the higher boiling point hydrocarbon compounds will remain in the bottoms stream with the solids/cuttings. The water will also be vaporized as part of the VDU process, but it will be separated from the LTMO downstream of the distillation column via decanters and oil-water separation, after it is condensed back into liquid form. Utilizing vacuum pressures in the VDU lowers the boiling points of the solution and its components, avoiding thermal cracking of the LTMO. Regarding difficulties with conveying and processing the high solids mixtures, the preferred embodiments of the invention also have a number of specific design components to overcome these challenges including placement and operation of the heat supply tubes and the mechanical-operational design of the reboiler.

Further, the preferred embodiments of the invention provide a method for the treatment of waste drilling mud and cuttings that allows for the recovery of the base drilling fluid in a near virgin state while generating a solid/sludge that may be further treated and/or disposed of in accordance with local environmental and regulatory regulations for safe disposal. Typically the waste drilling mud/cuttings can be comprised of solids, water and hydrocarbons in any ratio. Also the waste material may be mixed with additives such as defoaming agents, catalysts, chemicals, solids and liquids to improve the separation and recovery of the hydrocarbons from the waste material. These additives may be added before or during the operation of the system.

The preferred embodiments of the current invention take advantage of two important facts to improve the energy efficiency of the system and to prevent thermal cracking/degradation of the valuable LTMO base oil. These are:

1. The atmospheric boiling point of a liquid decreased as the surrounding pressure decreases;
2. The generation of steam within a closed vessel can reduce the partial pressure of a second substance and thereby reduce its atmospheric boiling point (referred to as steam stripping)

The boiling point of a liquid is the temperature at which the vapor pressure of the liquid is equal to the pressure exerted on the liquid by the surrounding environmental pressure. Consequently the boiling point of a liquid varies depending upon the surrounding pressure. When the pressure above a liquid is reduced, the vapor pressure needed to induce boiling is also reduced, and the boiling point of the liquid decreases. The result is that when under a vacuum, less energy is required to reach the boiling point and the liquid can be volatilized at temperatures well below it atmospheric boiling point.

Steam stripping is a process whereby the evaporation of a first component can occur at a temperature below its normal atmospheric boiling point. During the "stripping" process a second component is injected into the closed evaporation vessel. The vaporization of the second component within the closed vessel results in a decrease in the partial pressure of the gas phase of the first component. This reduction in the partial pressure of the first component reduces its boiling point. In order to get the full effect of the "striping" process the first and second components must be chemically different such that there is no molecular interaction between the two components in the gaseous phase. In the separation of hydrocarbons from the waste drilling mud/cuttings water serves as an excellent stripping component.

Since waste drilling mud/cuttings typically contains significant quantities of water the stripping process will occur naturally by ensuring that there is a constant supply of untreated waste drilling mud/cutting entering the system. The injection of a slipstream of fresh waste material introduces a small component of water into the system. This water is immediately flashed into hot steam and reduces the partial pressure of the gas phase hydrocarbon fractions being evaporated—thereby further reducing the boiling point of the hydrocarbon fraction being evaporated. Table 1 presents a summary of the typical boiling point reductions under a vacuum of 30 mmHg and with the effects of steam stripping.

TABLE 1

Example Boiling Point Reduction due to Vacuum & Steam Stripping Effects[4]

| Hydrocarbon Compound | Atmospheric Boiling Point (° C.) | Reduced Boiling Point (° C.) |
|---|---|---|
| $C_{10}$ | 174 | 65 |
| $C_{11}$ | 196 | 75 |
| $C_{12}$ | 216 | 88 |
| $C_{13}$ | 235 | 97 |
| $C_{14}$ | 254 | 110 |
| $C_{15}$ | 270 | 120 |
| $C_{16}$ | 287 | 130 |
| $C_{17}$ | 303 | 140 |
| $C_{18}$ | 316 | 147 |
| $C_{19}$ | 330 | 155 |
| $C_{20}$ | 344 | 160 |
| $C_{21}$ | 359 | 170 |
| $C_{22}$ | 369 | 175 |
| $C_{23}$ | 381 | 180 |
| $C_{24}$ | 391 | 185 |

Note[4]:
The value in this table are general values only and may vary depending on the actual composition and chemical structure of the particular hydrocarbon molecule.

Typically the waste drilling mud/cuttings are loaded into the VDU and the atmosphere inside the VDU is evacuated to 10-30 mmHg. Once the appropriate vacuum has been achieved the waste material is recirculated through a heat exchanger that has a hot oil heating system connected to the tube side of the exchanger. Heat is transferred from the hot oil to the recirculating waste mixture via conduction through the heat exchanger tube walls.

As the material is recirculated its temperature continues to rise until it reaches the boiling point of water associated with the vacuum within the VDU (typically 20-35° C.). From this point onwards the VDU will behave as a typical fractional distillation tower. The temperature will essentially remain at this point until the majority of water and low molecular weight hydrocarbons (i.e. $<C_5$) are evaporated from the system leaving behind a mixture of solids and hydrocarbons ranging from $C_6$-$C_{60}$. Once the majority of water has been removed from the mixture the temperature will continue to rise until it reached the next temperature plateau associated with a major hydrocarbon component. Typically all of the water and hydrocarbon compounds collected at vapor temperatures below 65° C. are sent to a slops receiving vessel for subsequent treatment or disposal.

Once the VDU vapor temperature reaches 65° C. the system is begins to generating hydrocarbon vapors comprised of LTMO drilling fluid (i.e. $C_{10}$). As the vapor temperature rises between 65° C. and 185° C. the system will recover the LTMO portion of the hydrocarbons within the waste drilling mud/cuttings mixture. Once the vapor temperature exceeds 185° C. the hydrocarbons being recovered are beyond the LTMO drilling fluid range (i.e. $>C_{24}$). The resulting solids/sludge within the VDU is now comprised of solids and heavy hydrocarbons from the reservoir (i.e. $C_{25}$-$C_{60}$). This solids/sludge material may be sent for further treatment and/or disposal as required.

While the VDU is operating within the LTMO drilling fluid recovery range (i.e. vapor temperature of 65-185° C.)

a slipstream of fresh waste drill mud/cuttings may be injected into the recirculating loop. The quantity of material injected may vary depending on the chemical and physical characteristics of the waste drilling mud/cuttings and the operating rate of the VDU. This injection of a minor slipstream of fresh waste mud/cutting is performed in order to improve the efficiency of the process and to take advantage of the "steam stripping" effect to reduce the boiling point of evaporable liquids. The injection of the slipstream of fresh waste material introduces a very small component of water into the VDU. This water is immediately flashed into hot steam and reduces the partial pressure of the gas phase hydrocarbon fractions being evaporated and further reduces the boiling point of the hydrocarbon fraction being evaporated.

During the VDU operation, recovered water and/or recovered hydrocarbons may be reinjected back into the VDU distillation tower. Similar to standard reflux operations, this reflux process can be used to increase the purity of the recovered LTMO drilling fluid. In an ideal scenario the VDU distillation tower would produce a pure product. However, in reality the LTMO drilling fluid vapors may contain some heavier hydrocarbon fractions (i.e. $C_{25}$-$C_{26}$) near the end of the LTMO recovery phase (i.e. as the vapor temperature approaches 185° C.). This is often referred to as overlap.

Injecting a cool reflux liquid into the top of the distillation tower results in a slight cooling of the vapors at the top of the column. As the reflux cools the top of the tower, vapors comprised of heavier hydrocarbon fractions (i.e. $C_{25}$-$C_{26}$) condense and flow back down the tower. Meanwhile the top of the tower is still hot enough to keep the lighter hydrocarbon fractions (i.e. $C_{23}$-$C_{24}$) in vapor form. By condensing and removing the heavier hydrocarbon fractions the purity of the vapors exiting the distillation column is increased and the efficiency of the distillation column is improved.

During operation of the VDU, all water and hydrocarbon vapor generated within the unit are extracted from the main VDU distillation tower and sent to a separate vapor collection and condensing system. This step is comprised of the cooling of the hot vapors via a condenser system. The hot vapors are routed thought a heat exchanger whereby the heat is extracted from the vapors by a coolant within the tube side of the heat exchanger. As the vapors cool they condense back into a liquid phase. This liquid phase is then sent to a decanting receiver system whereby the hydrocarbon/water mixtures are separated into distinct hydrocarbon and water layers. Each recovered product, hydrocarbon or water, is then sent to the appropriate storage tank for subsequent recycling or disposal.

The remaining air exhaust from the vapor collection and condensing system (essentially non-condensable leakage air and/or entrained air) is directed through a carbon adsorption system to remove any residual light end hydrocarbons within the vapor stream prior to discharge to the atmosphere via an exhaust stack.

During the vapor collection process the vapor may be processed in a catalytic reactor for the purification and/or removal of any degradation products within the vapor stream. The catalytic reactor, and the catalyst employed, would be based on the types and quantities of degradation products that may require removal and the types of chemical compounds contained within the waste drilling mud/cuttings.

Solids/sludge from the VDU process will typically consist of solids and heavy hydrocarbons ranging from $C_{25}$-$C_{60}$. The concentration of hydrocarbons within the solids/sludge will vary depending on the chemical and physical properties of the waste drilling mud/cutting as well as the operational parameters of the VDU system. These hydrocarbons are not associated with the LTMO drilling fluid and were deposited onto the drilling mud/cuttings during the drilling operations and represent the specific hydrocarbon resource associated with a particular well formation.

Solids/sludge from the VDU system will be conveyed from the VDU into as storage, transportation and/or treatment system for subsequent treatment/disposal in accordance with applicable environmental and regulations for the treatment/disposal of waste materials.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

The invention claimed is:

1. A method for remediating drilling mud and cuttings that include a solids portion, the method comprising steps of:
   providing a remediation plant comprising:
      a vacuum distillation unit (VDU) that includes a vacuum-assisted distillation column and a condenser; and
      an oil-water separator;
   reducing a pressure within the distillation column to a reduced pressure that is less than atmospheric pressure;
   distilling the drilling mud and cuttings, including the solids portion, within the distillation column at the reduced pressure by raising a temperature of the drilling mud and cuttings to a temperature that is less than a cracking temperature of a drilling fluid that includes hydrocarbons having a chain length up to $C_{24}$ and that does not include hydrocarbons having a chain length equal to or greater than $C_{25}$ in the drilling mud and cuttings such that a liquids portion of the drilling mud and cuttings including hydrocarbons having a chain length up to $C_{24}$ and not including hydrocarbons having a chain length equal to or greater than $C_{25}$ forms a vapor;
   separating the vapor from the solids portion of the drilling mud and cuttings;
   in the condenser, condensing the separated vapor to form a condensed liquid; and
   using the oil-water separator, segregating the condensed liquid into a recovered drilling fluid that is physically and chemically equivalent to a virgin form of the drilling fluid and a water-containing portion.

2. The method of claim 1 wherein the reduced pressure ranges from approximately 10 mmHg to approximately 30 mmHg.

3. The method of claim 1 wherein the step of segregating the condensed liquid using the oil-water separator is carried out at atmospheric pressure.

4. The method of claim 3, wherein, following the step of reducing a pressure within the distillation column, only the step of segregating is carried out at atmospheric pressure.

5. The method of claim 1 further comprising a step of limiting a maximum molecular weight of hydrocarbons contained in the vapor using at least one of temperature and pressure in the distillation column.

6. The method of claim 1 further comprising a step of reinjecting at least a portion of the condensed liquid back into the VDU in order to increase a purity of a resulting hydrocarbon-containing portion.

7. The method of claim 6 further comprising a step of, prior to segregating condensed vapor using the oil-water separator, gravity separating the condensed vapor in order to separate the hydrocarbon-containing portion from a water-containing portion.

8. The method of claim 1 wherein the remediation plant further comprises a heating system for heating the drilling mud and cuttings within the VDU having a heat exchanger comprising a recirculating loop and wherein the drilling mud and cuttings are heated to a temperature that is within a recovery range between 65° C. and 185° C. by circulating through the recirculating loop.

9. The method of claim 8 further comprising a step of, while the drilling mud and cuttings are circulating in the recirculating loop and are heated to be within the recovery range, injecting fresh drilling mud and cuttings into the recirculating loop such that water in the fresh drilling mud and cuttings is immediately flashed into steam and steam strips the drilling mud and cuttings.

10. The method of claim 1 further comprising a step of cooling a top portion of the distillation column such that a first portion of the vapor that is comprised of heavier hydrocarbon fractions having a first molecular weight condenses and remains in the distillation column, while at the same time a second portion of the vapor that is comprised of light hydrocarbon fractions having a second and lighter molecular weight is separated from the first portion of the vapor and is condensed in the condenser.

11. The method of claim 1 wherein the step of distilling the drilling mud and cuttings is continuous.

12. The method of claim 1 further comprising a step of supplying the condensed vapor from the condenser into a condenser tank at the reduced pressure, isolating the condenser tank from the distillation column, and then decanting the condenser tank.

* * * * *